US012793638B2

(12) United States Patent
Lee et al.

(10) Patent No.: US 12,793,638 B2
(45) Date of Patent: Nov. 10, 2026

(54) ELECTRONIC DEVICE

(71) Applicant: Samsung Display Co., LTD., Yongin-si (KR)

(72) Inventors: Sukhun Lee, Yongin-si (KR); Hongsoo Kim, Yongin-si (KR); Sangan Kwon, Yongin-si (KR); Namjeong Kim, Yongin-si (KR); Jiyoun Kim, Yongin-si (KR); Jihye Kim, Yongin-si (KR); Haneul Kim, Yongin-si (KR); Changnoh Yoon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/225,086

(22) Filed: Jun. 2, 2025

(65) Prior Publication Data

US 2026/0038435 A1 Feb. 5, 2026

(30) Foreign Application Priority Data

Jul. 31, 2024 (KR) ........................ 10-2024-0101440

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01); *G09G 2320/0247* (2013.01); *G09G 2320/028* (2013.01); *G09G 2330/021* (2013.01); *G09G 2380/10* (2013.01)

(58) Field of Classification Search
CPC ................... G09G 3/3233; G09G 3/32; G09G 2300/0819; G09G 2320/0247; G09G 2320/028; G09G 2330/021; G09G 2380/10
See application file for complete search history.

(56) References Cited

U.S. PATENT DOCUMENTS

| | | | | |
|---|---|---|---|---|
| 11,348,512 | B2 * | 5/2022 | Kim | G09G 3/3225 |
| 11,468,833 | B2 * | 10/2022 | Lee | G09G 3/3225 |
| 11,532,280 | B2 * | 12/2022 | Noh | G09G 3/3266 |
| 11,875,717 | B2 * | 1/2024 | Zhang | G09G 3/20 |
| 11,875,734 | B2 * | 1/2024 | Xiao | G09G 3/2007 |

(Continued)

FOREIGN PATENT DOCUMENTS

| | | | |
|---|---|---|---|
| KR | 101436945 | B1 | 8/2014 |
| KR | 1020220017546 | A | 2/2022 |

*Primary Examiner* — Vinh T Lam
(74) *Attorney, Agent, or Firm* — CANTOR COLBURN LLP

(57) ABSTRACT

Disclosed is an electronic device including a display panel and a driving circuit. A pixel includes a first light emitting element, a second light emitting element, and a pixel circuit unit. The pixel circuit unit includes a first switching circuit for applying a driving current to the first light emitting element in response to a first switching signal activated in a first mode, and a second switching circuit for applying the driving current to the second light emitting element in response to a second switching signal activated in a second mode. The driving signal has a compensation frequency during a mode switching period set based on a mode switching time point. The compensation frequency is higher than a driving frequency of the driving signal during a first mode period or a second mode period different from the mode switching period.

19 Claims, 21 Drawing Sheets

(56) References Cited

U.S. PATENT DOCUMENTS 11,922,866 B1 * 3/2024 Sohn ........................ G09G 3/32
12,205,527 B2 * 1/2025 Zhou ........................ G09G 3/32
12,249,270 B2 * 3/2025 Huo ..................... G09G 3/3233
12,283,222 B2 * 4/2025 Jeon ......................... G09G 3/32
2017/0092191 A1 * 3/2017 An ........................ G09G 3/3233
2019/0051250 A1 * 2/2019 Lee ...................... G09G 3/3233
2019/0096330 A1 * 3/2019 Kim ..................... G09G 3/3266
2019/0244572 A1 * 8/2019 Le ........................ G09G 3/3406
2021/0049958 A1 * 2/2021 Kim ..................... G09G 3/3283
2021/0304680 A1 * 9/2021 Park ..................... G09G 3/3233
2021/0390905 A1 * 12/2021 Kim ................... H10K 59/1213
2021/0407424 A1 * 12/2021 Long .................... G09G 3/3266
2022/0043300 A1 2/2022 Kim
2022/0139333 A1 * 5/2022 Jin ........................ G09G 3/3233
345/214
2022/0199049 A1 * 6/2022 Hua ......................... G09G 3/20
2022/0238076 A1 * 7/2022 Bae .......................... G09G 3/03
2022/0328008 A1 * 10/2022 Song .................... G09G 3/3233
2022/0335888 A1 * 10/2022 Song .................... G09G 3/3266
2022/0351659 A1 * 11/2022 Kwon ...................... G09G 3/20
2023/0079102 A1 * 3/2023 Kim ..................... G09G 3/3233
345/204
2023/0113452 A1 * 4/2023 Kim ..................... G09G 3/3233
345/691
2023/0116559 A1 * 4/2023 Park ......................... G09G 3/32
345/204
2023/0137517 A1 * 5/2023 Fu ............................ G09G 3/20
345/214
2023/0145805 A1 * 5/2023 Kim ..................... G09G 3/2096
345/691
2023/0260449 A1 * 8/2023 Yoon ........................ G09G 3/32
345/55
2023/0316976 A1 * 10/2023 Zhou ........................ G09G 3/20
345/212
2024/0005868 A1 * 1/2024 Kim ..................... G09G 3/3233
2024/0078972 A1 * 3/2024 Zhang .................. G09G 3/3233
2024/0111381 A1 * 4/2024 Song .................. G06V 40/1318
2024/0127755 A1 * 4/2024 Chung ..................... G09G 3/32
2025/0029548 A1 * 1/2025 You ...................... G09G 3/3233
2025/0046255 A1 * 2/2025 Kwon .................. G09G 3/3233
2025/0054433 A1 * 2/2025 Sasaki .................. G09G 3/2092
2025/0095550 A1 * 3/2025 Choi ........................ G09G 3/32

* cited by examiner

<First Mode>

<Second Mode>

ELECTRONIC DEVICE

This application claims priority to Korean Patent Application No. 10-2024-0101440, filed on Jul. 31, 2024, and all the benefits accruing therefrom under 35 U.S.C. § 119, the content of which in its entirety is herein incorporated by reference.

BACKGROUND

Field

Embodiments of the present disclosure described herein relate to an electronic device, and more particularly, an electronic device capable of switching between a wide viewing angle mode and a narrow viewing angle mode.

Description of the Related Art

Each of multimedia electronic devices such as, for example, a TV, a mobile phone, a tablet personal computer (PC), a navigation system, a game console, and the like includes an electronic device that displays an image. In some cases, the electronic device may be provided inside a vehicle.

In addition to a general input method such as, for example, a button, a keyboard, a mouse, or the like, the electronic device may include an input sensing layer supportive of a touch-based input method that allows a user to enter information or commands easily and intuitively.

SUMMARY

Embodiments of the present disclosure provide an electronic device having improved display quality and being capable of being switched between a wide viewing angle mode and a narrow viewing angle mode.

According to an embodiment, an electronic device includes a display panel including a pixel and a driving circuit that applies a driving signal to the display panel. The pixel includes a first light emitting element, a second light emitting element, and a pixel circuit unit that drives the first light emitting element and the second light emitting element.

The pixel circuit unit includes a first switching circuit which is electrically connected to the first light emitting element and applies a driving current to the first light emitting element in response to a first switching signal activated in a first mode, and a second switching circuit which is electrically connected to the second light emitting element and applies the driving current to the second light emitting element in response to a second switching signal activated in a second mode.

The driving signal has a compensation frequency during a mode switching period set based on a mode switching time point. The compensation frequency is higher than a driving frequency of the driving signal during a first mode period associated with the first mode or a second mode period associated with the second mode, wherein the first mode period and the second mode period are different from the mode switching period.

According to an embodiment, an electronic device includes a display panel including a pixel, a driving circuit that applies a driving signal to the display panel, and a driving controller that controls driving of the driving circuit.

The driving controller includes a luminance calculation unit that calculates average luminance based on the input image signal, a frequency determination unit that receives a mode signal, activates when a state of the mode signal is switched, and determines a compensation frequency of the driving signal based on the average luminance, and a control signal generation unit that generates a driving control signal and provides the driving control signal to the driving circuit such that the driving circuit operates at the determined compensation frequency.

The driving signal has the compensation frequency during a mode switching period set based on a time point at which the state of the mode signal is switched. The compensation frequency is higher than a driving frequency of the driving signal during a first mode period or a second mode period, wherein the first mode period and the second mode period are different from the mode switching period.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
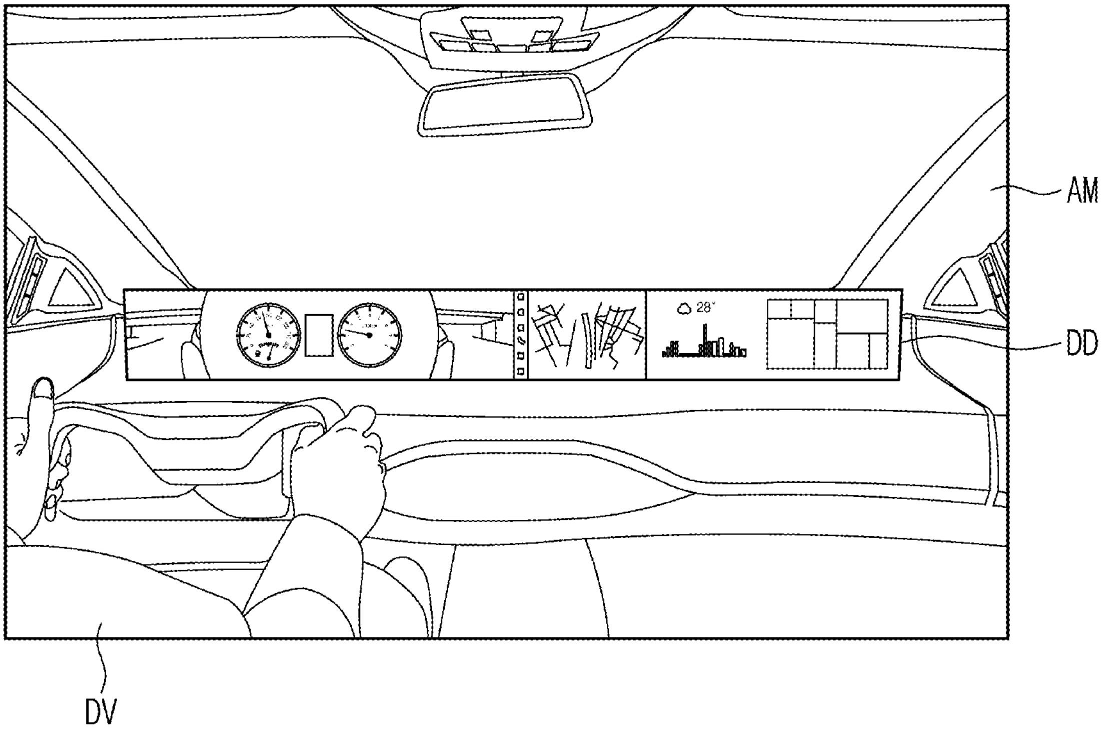
FIG. 1 is a drawing illustrating an interior of a vehicle, in which an electronic device is placed, according to an embodiment of the present disclosure.

In the specification, the expression that a first component (or region, layer, part, portion, or other feature) is "on", "connected with", or "coupled with" a second component means that the first component is directly on, connected with, or coupled with the second component or means that a third component is interposed therebetween.

The same reference numerals refer to the same components. In the drawings, the thickness, ratio, and dimension of components are exaggerated for effectiveness of description of technical contents. The term "and/or" includes one or more combinations in each of which associated elements are defined.

Although the terms "first", "second", and the like may be used to describe various components, the components should not be construed as being limited by the terms. The terms are used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

The terms "under", "below", "on", "above", and the like are used to describe the correlation of components illustrated in drawings. The terms that are relative in concept are described based on a direction illustrated in drawings.

It will be understood that the terms "include", "comprise", "have", and the like specify the presence of features, numbers, steps, operations, elements, or components, described in the specification, or a combination thereof, not precluding the presence or additional possibility of one or more other features, numbers, steps, operations, elements, or components or a combination thereof.

The term "substantially," as used herein, means approximately or actually. The term "substantially equal" means approximately or actually equal. The term "substantially the same" means approximately or actually the same. The term "substantially perpendicular" means approximately or actually perpendicular. The term "substantially parallel" means approximately or actually parallel.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a drawing illustrating an interior of a vehicle, in which an electronic device is placed, according to an embodiment of the present disclosure.

Referring to FIG. 1, an electronic device DD may be placed inside a vehicle AM. The electronic device DD may be placed inside the vehicle AM and provide various pieces of information to a driver DV (or user). The electronic device DD may provide the driver DV with information about weather, speed, or maps, or images such as, for example, movies. The electronic device DD may be a touch-based electronic device capable of operating in response to a touch input of the driver DV.

Although the electronic device DD for a vehicle is illustrated in FIG. 1, embodiments of the present disclosure are not limited thereto. For example, the electronic device DD according to an embodiment of the present disclosure may be used in electronic devices such as, for example, smartphones, digital cameras, notebook computers, monitors, and smart televisions that provide images to users.

Figure 2A:
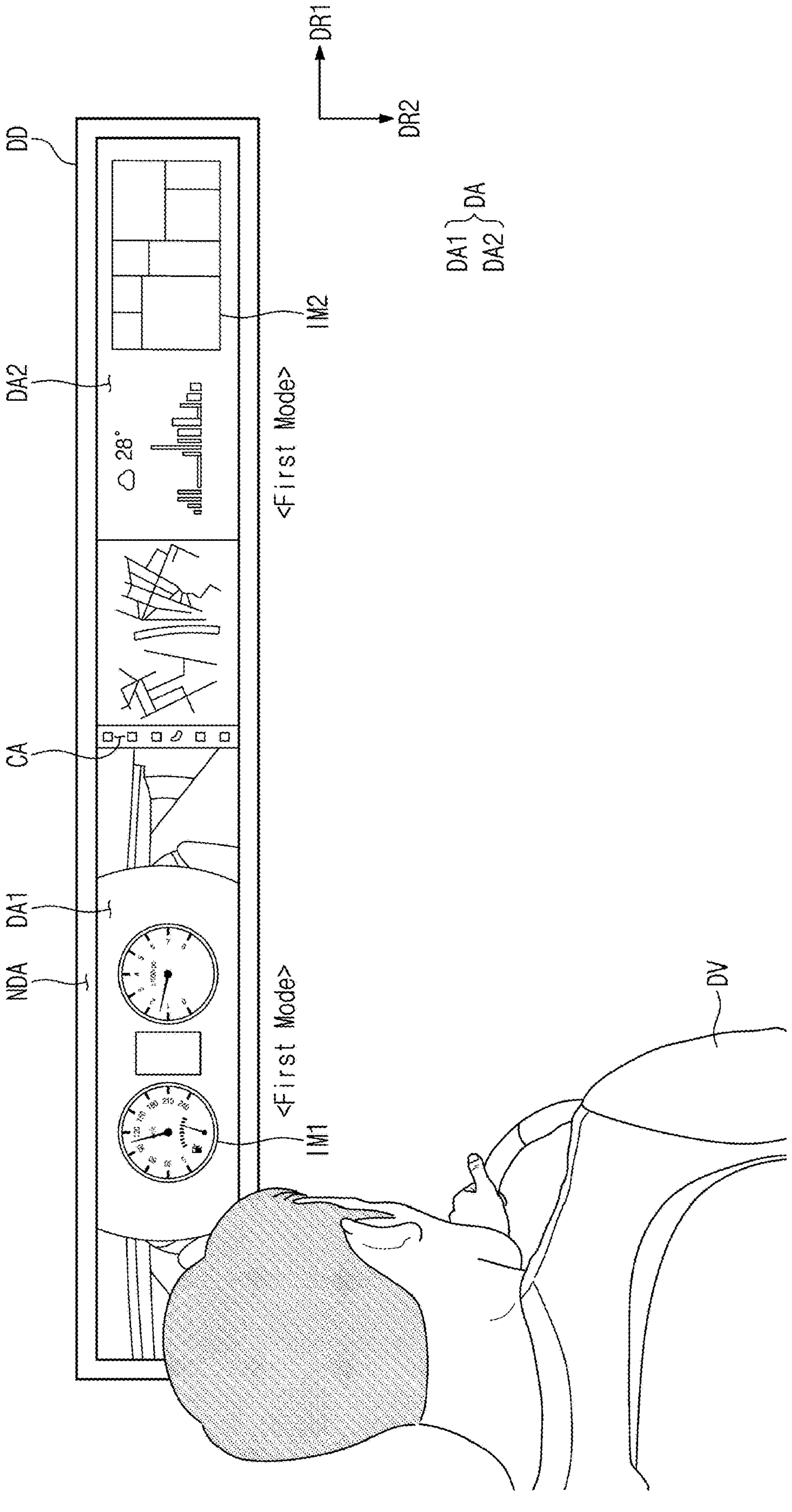
FIG. 2A is a diagram illustrating a state, in which a second display area of an electronic device operates in a first mode, according to an embodiment of the present disclosure.
Figure 2B:
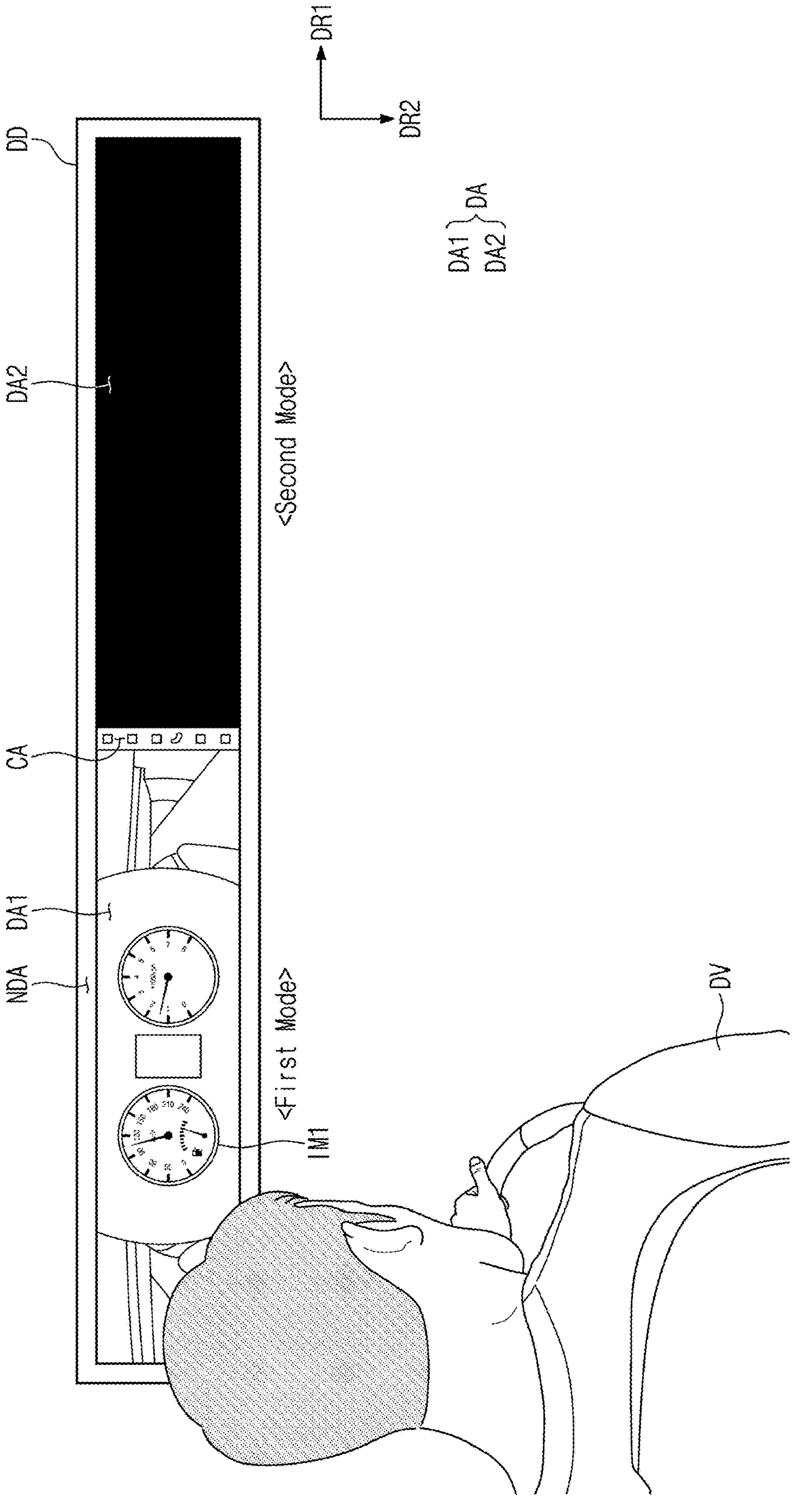
FIG. 2B is a diagram illustrating a state, in which a second display area of an electronic device operates in a second mode, according to an embodiment of the present disclosure.
Figure 3A:
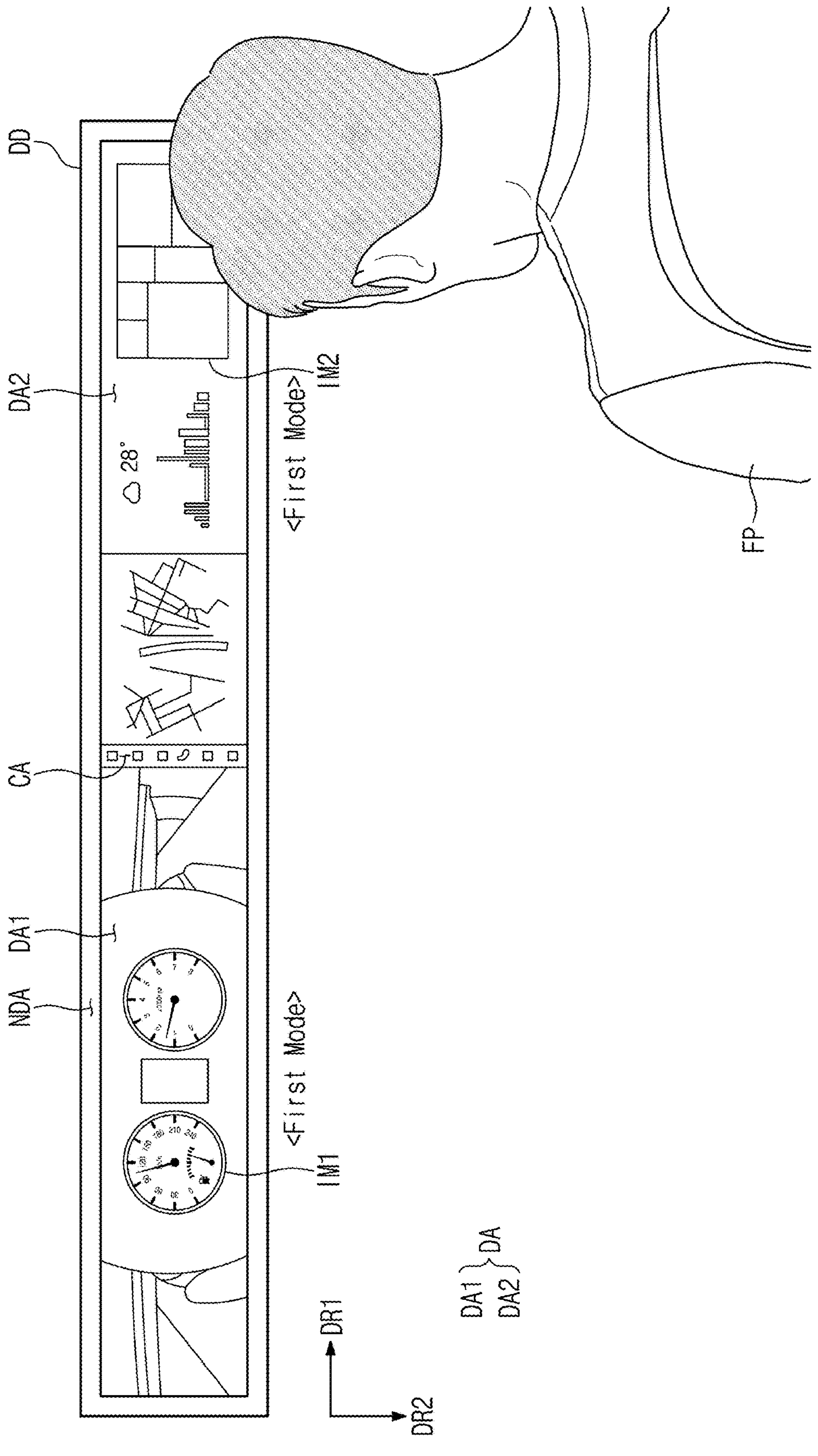
FIG. 3A is a diagram illustrating a state, in which a first display area of an electronic device operates in a first mode, according to an embodiment of the present disclosure.
Figure 3B:
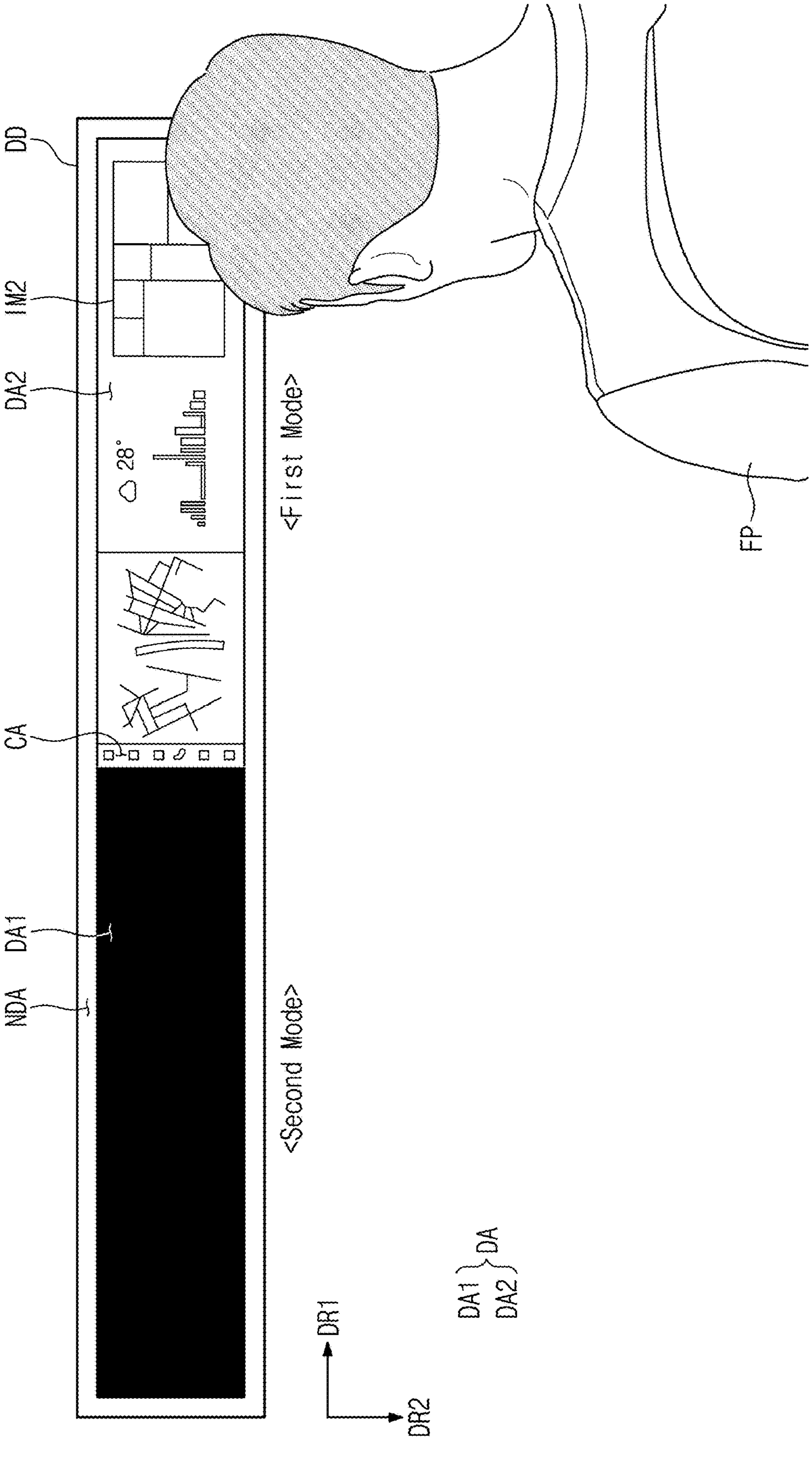
FIG. 3B is a diagram illustrating a state, in which a first display area of an electronic device operates in a second mode, according to an embodiment of the present disclosure.

FIG. 2A is a diagram illustrating a state, in which a second display area of an electronic device operates in a first mode, according to an embodiment of the present disclosure. FIG. 2B is a diagram illustrating a state, in which a second display area of an electronic device operates in a second mode, according to an embodiment of the present disclosure. FIG. 3A is a diagram illustrating a state, in which a first display area of an electronic device operates in a first mode, according to an embodiment of the present disclosure. FIG. 3B is a diagram illustrating a state, in which a first display area of an electronic device operates in a second mode, according to an embodiment of the present disclosure.

Referring to FIGS. 2A and 2B, the electronic device DD may have a plane defined by a first direction DR1 and a second direction DR2 that intersect each other. The electronic device DD may have long sides extending in the first direction DR1 and short sides extending in the second direction DR2. The electronic device DD may have a rectangular shape, but the shape of the electronic device DD is not limited thereto and may have various shapes. Moreover, corner parts of the electronic device DD connecting the long sides and the short sides may have curved shapes.

The front surface of the electronic device DD may be defined as a display surface and may have a plane defined by the first direction DR1 and the second direction DR2. Images generated by the electronic device DD may be provided to a user through a display surface.

The electronic device DD may include a display area DA and a non-display area NDA surrounding the display area DA. The display area DA may display an image, and the non-display area NDA may not display an image. The non-display area NDA may surround the display area DA and may define a border of the display device DD printed in predetermined color.

As an example of the present disclosure, the display area DA may include a first display area DA1 and a second display area DA2. The first display area DA1 and the second display area DA2 are adjacent to each other in the first direction DR1, and an intermediate area CA may be placed between the first display area DA1 and the second display area DA2. The first display area DA1 displays a first image IM1, and the second display area DA2 displays a second image IM2. The first display area DA1 may be an area located in front of a driver's seat of the vehicle AM (see FIG.

1). The second display area DA2 may be an area located in front of a passenger's seat of the vehicle AM.

As an example of the present disclosure, the first display area DA1 and the second display area DA2 may be driven independently of each other. For example, the first display area DA1 may display images in a first mode or a second mode, and the second display area DA2 may also display images in the first mode or the second mode. Here, the first mode may be referred to as a "public mode" or a "wide viewing angle mode". The second mode may be referred to as a "private mode" or a "narrow viewing angle mode". In an example in which one of the first and second display areas DA1 and DA2 operates in the second mode, the image viewing range becomes narrow, and thus an image may be perceived only in the front direction. In some embodiments, when one of the first and second display areas DA1 and DA2 operates in the first mode, the image viewing range may be widened, and thus the image may also be perceived in the lateral direction.

As illustrated in FIGS. 2A and 3A, both the first and second display areas DA1 and DA2 may operate in the first mode. In the first mode, the driver DV of the vehicle AM may perceive not only the first image IM1 displayed in the first display area DA1, but also the second image IM2 displayed in the second display area DA2. Furthermore, in the first mode, a front passenger FP may perceive the first image IM1 displayed in the first display area DA1 as well as the second image IM2 displayed in the second display area DA2.

However, as illustrated in FIG. 2B, the first display area DA1 may operate in the first mode, and the second display area DA2 may operate in the second mode. In this case, the driver DV may perceive the first image IM1 displayed in the first display area DA1, but may not perceive the second image IM2 displayed in the second display area DA2.

As an example of the present disclosure, the mode switching (e.g., switching from the first mode to the second mode or from the second mode to the first mode) of the second display area DA2 may be automatically performed based on the driving speed of the vehicle AM. In an example in which the driving speed of the vehicle AM is smaller than a predetermined reference speed, the second display area DA2 may display an image in the first mode. However, when the driving speed of the vehicle AM exceeds the reference speed, the electronic device DD may switch the mode of the second display area DA2 to the second mode. Accordingly, when the driving speed exceeds the reference speed, the driver DV may not perceive the second image IM2 displayed in the second display area DA2.

In some embodiments, as illustrated in FIG. 3B, the first display area DA1 may operate in the second mode, and the second display area DA2 may operate in the first mode. In this case, the front passenger FP may perceive the second image IM2 displayed in the second display area DA2, but may not perceive the first image IM1 displayed in the first display area DA1.

As an example of the present disclosure, the mode switching method of the first and second display areas DA1 and DA2 may be performed in various ways by a user's operation (or settings).

Figure 4A:
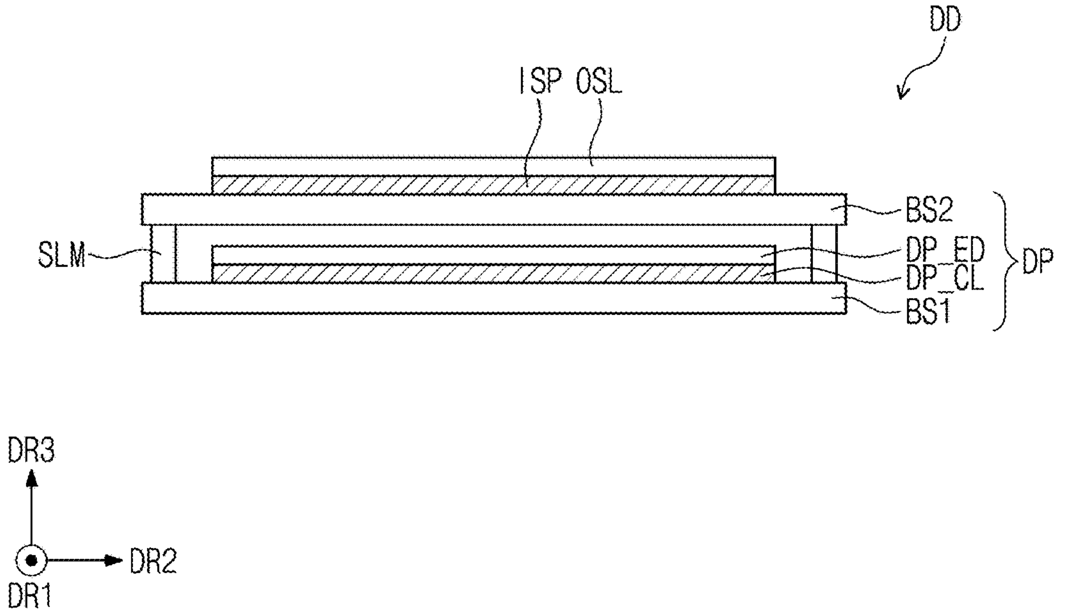
FIG. 4A is a cross-sectional view of an electronic device, according to an embodiment of the present disclosure.
Figure 4B:
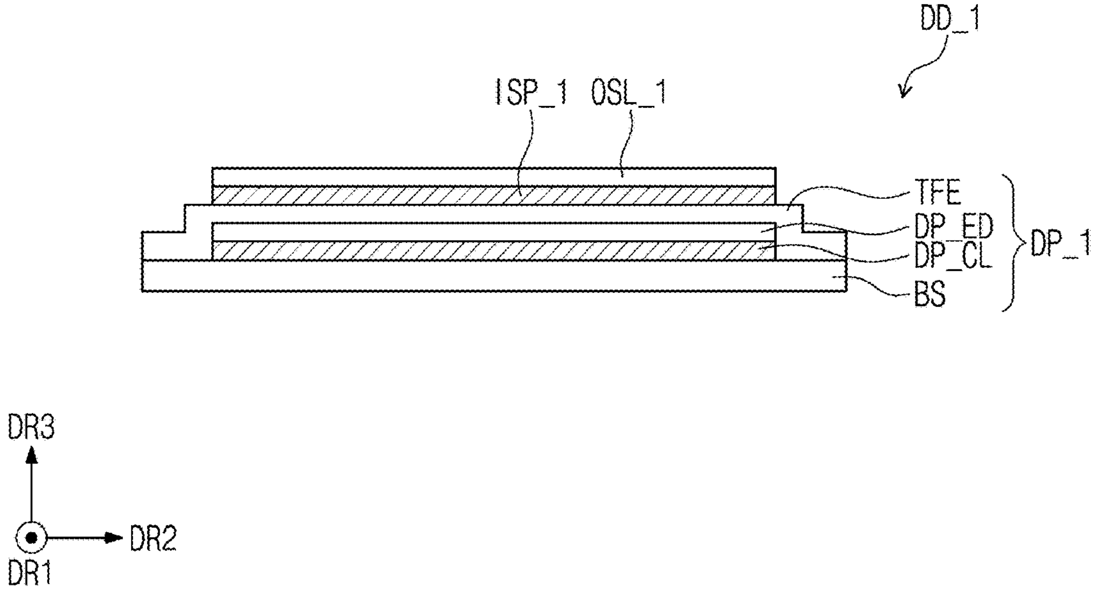
FIG. 4B is a cross-sectional view of an electronic device, according to an embodiment of the present disclosure.
Figure 5A:
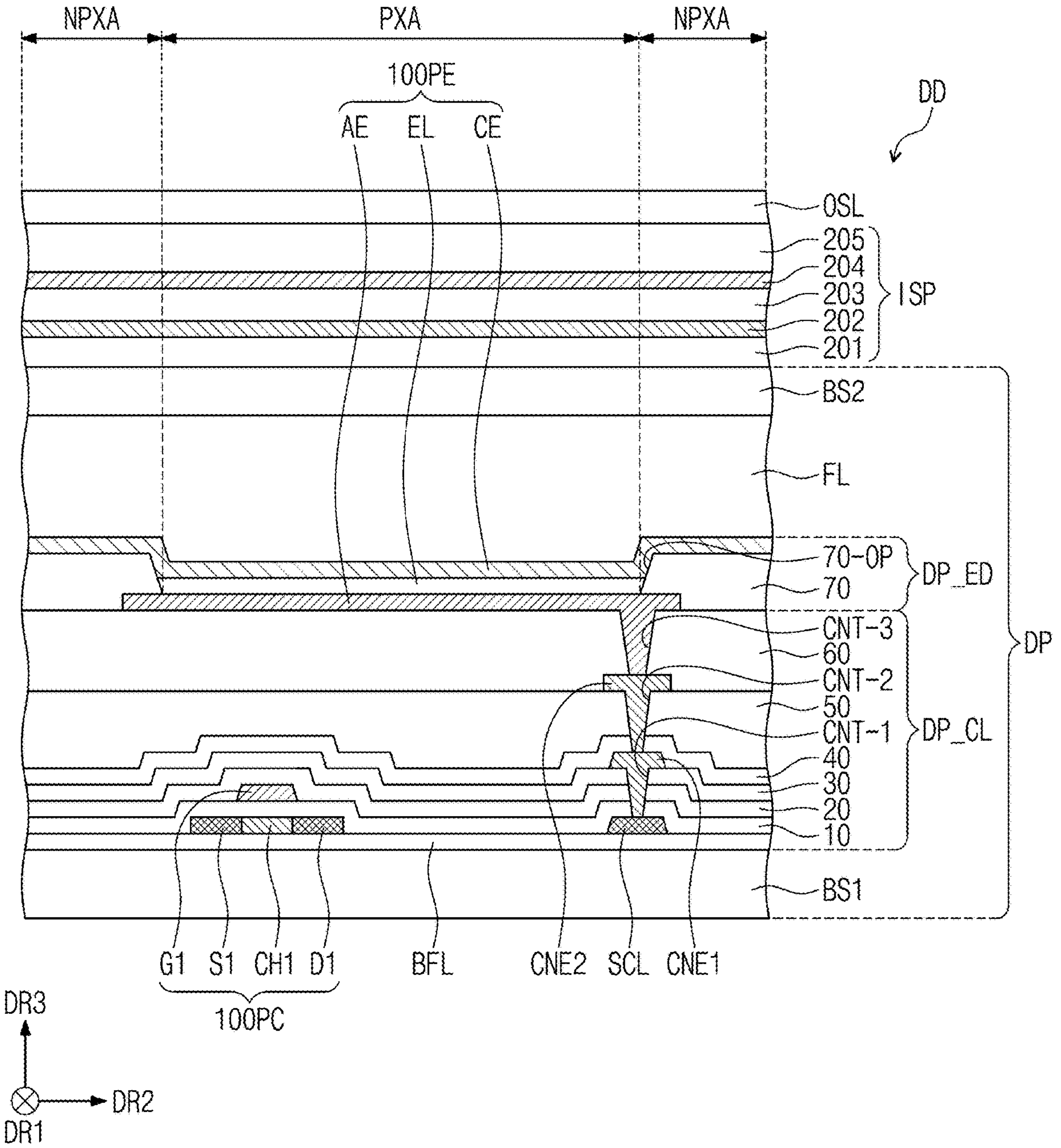
FIG. 5A is an enlarged cross-sectional view of a portion of the electronic device illustrated in FIG. 4A.
Figure 5B:
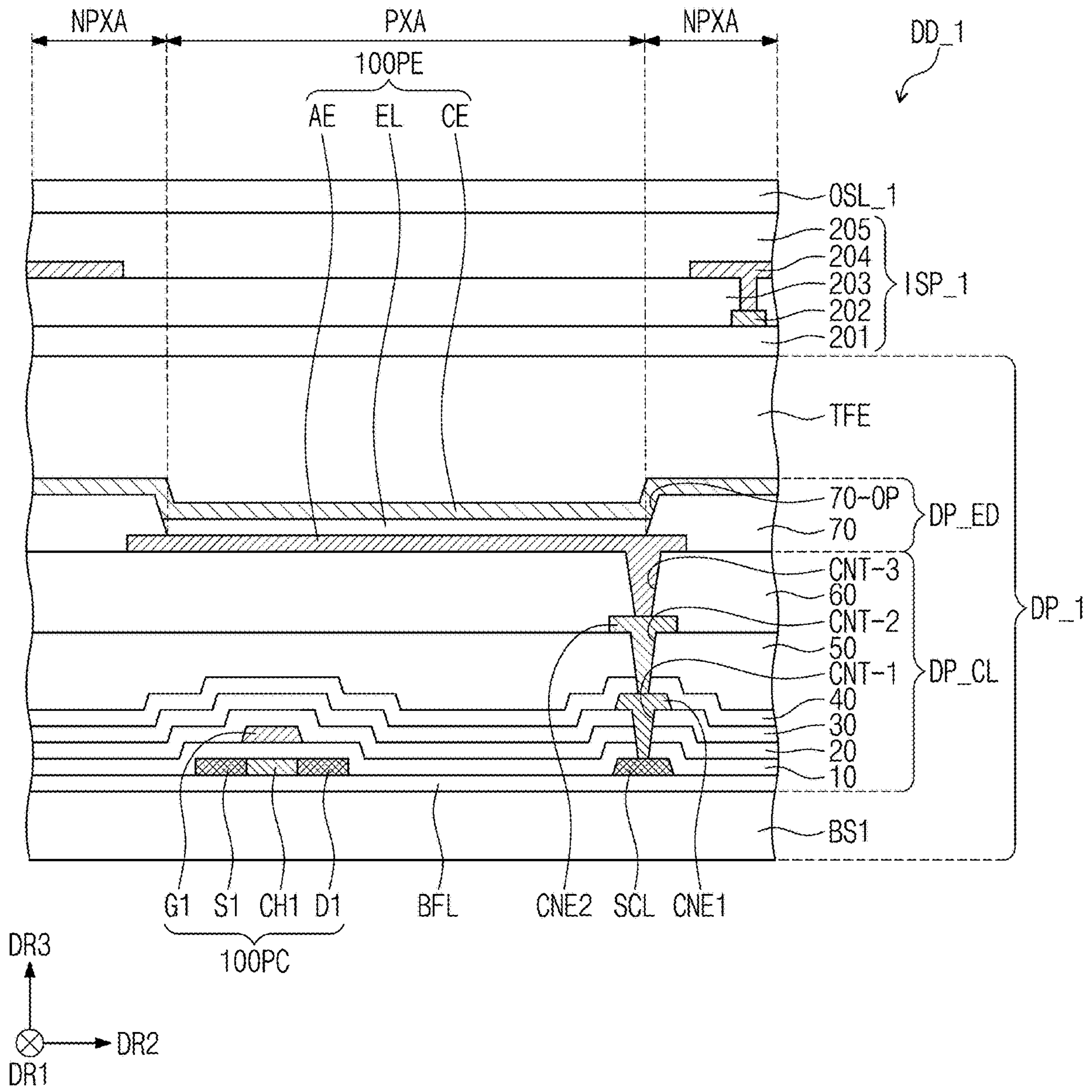
FIG. 5B is an enlarged cross-sectional view of a portion of the electronic device illustrated in FIG. 4B.

FIG. 4A is a cross-sectional view of an electronic device, according to an embodiment of the present disclosure. FIG. 4B is a cross-sectional view of an electronic device, according to an embodiment of the present disclosure. FIG. 5A is an enlarged cross-sectional view of a portion of the electronic device illustrated in FIG. 4A. FIG. 5B is an enlarged cross-sectional view of a portion of the electronic device illustrated in FIG. 4B.

Referring to FIG. 4A, the electronic device DD may include a display panel DP and an input sensing layer ISP. The input sensing layer ISP may be referred to as an "input sensing panel".

The display panel DP may include a first base layer BS1, a display circuit layer DP_CL, a display element layer DP_ED, a second base layer BS2, and a coupling member SLM. The input sensing layer ISP may be placed on the second base layer BS2.

Each of the first base layer BS1 and the second base layer BS2 may be a stacked structure including a silicon substrate, a plastic substrate, a glass substrate, an insulating film, or a plurality of insulating layers.

The display circuit layer DP_CL may be placed on the first base layer BS1. The display circuit layer DP_CL may include a plurality of insulating layers, a plurality of conductive layers, and a semiconductor layer. The plurality of conductive layers of the display circuit layer DP_CL may constitute signal wires or a control circuit of a pixel.

The display element layer DP_ED may be placed on the display circuit layer DP_CL. The display element layer DP_ED may include light emitting elements. For example, the display element layer DP_ED may include organic light emitting diodes, inorganic light emitting diodes, quantum dots, quantum rods, micro LEDs, or nano LEDs.

The second base layer BS2 may be placed on the display element layer DP_ED. A predetermined space may be defined between the second base layer BS2 and the display element layer DP_ED. The space may be filled with air or inert gas. Furthermore, in an embodiment of the present disclosure, the space may be filled with a filling layer FL (see FIG. 5A) such as, for example, silicone-based polymer, epoxy-based resin, or acrylic-based resin.

The coupling member SLM may be interposed between the first base layer BS1 and the second base layer BS2. The coupling member SLM may combine the first base layer BS1 and the second base layer BS2. The coupling member SLM may include an organic material such as, for example, a photocurable resin or a photoplastic resin, or may include an inorganic material such as, for example, a frit seal, and is not limited to an embodiment.

The input sensing layer ISP may include a plurality of insulating layers and a plurality of conductive layers. The plurality of conductive layers may consist of sensing electrodes that sense an external input, sensing wires electrically connected to the sensing electrodes, and sensing pads electrically connected to the sensing wires.

The electronic device DD may further include an optical path control layer OSL. The optical path control layer OSL may be placed on the input sensing layer ISP. The optical path control layer OSL may include a structure for controlling the path of light output from the display panel DP.

Referring to FIG. 4B, an electronic device DD_1 may include a display panel DP_1, an input sensing layer ISP_1, and an optical path control layer OSL_1.

The display panel DP_1 may include a base layer BS, the display circuit layer DP_CL, the display element layer DP_ED, and an encapsulation layer TFE. The base layer BS may be of a flexible type. The input sensing layer ISP_1 may be placed on the encapsulation layer TFE. According to an embodiment of the present disclosure, the display panel DP_1 and the input sensing layer ISP_1 may be formed through a subsequent process. That is, the input sensing layer ISP_1 may be formed directly on the encapsulation layer TFE.

The optical path control layer OSL_1 may be disposed on the input sensing layer ISP_1. The optical path control layer OSL_1 may be formed through a sequential process with the display panel DP_1 and the input sensing layer ISP_1, and may be disposed directly on the input sensing layer ISP_1. However, an embodiment is not particularly limited thereto. For example, the optical path control layer OSL_1 may be coupled to the input sensing layer ISP_1 through an adhesive layer. Configurations of the optical path control layers OSL and OSL_1 will be described in detail later with reference to FIGS. 10A and 10B.

Referring to FIGS. 4A and 5A, at least one inorganic layer may be formed on the upper surface of the first base layer BS1 in the display panel DP. The inorganic layer may include at least one of aluminum oxide, titanium oxide, silicon oxide, silicon oxynitride, silicon nitride, zirconium oxide, and hafnium oxide. The inorganic layer may be formed of multiple layers. The inorganic layers composed of multiple layers may constitute a barrier layer and/or a buffer layer. In an embodiment, it is illustrated that the display panel DP includes a buffer layer BFL.

The buffer layer BFL may improve a bonding force between the first base layer BS1 and a semiconductor pattern. The buffer layer BFL may include a silicon oxide layer and a silicon nitride layer. The silicon oxide layer and the silicon nitride layer may be stacked alternately.

The semiconductor pattern may be disposed on the buffer layer BFL. The semiconductor pattern may include polysilicon. However, embodiments of the present disclosure are not limited thereto, and the semiconductor pattern may include amorphous silicon, low-temperature polycrystalline silicon, or an oxide semiconductor.

FIG. 5A illustrates a part of the semiconductor pattern, and the semiconductor pattern may be further disposed in another area. The semiconductor patterns may be arranged across pixels in a specific rule. The semiconductor pattern may have different electrical characteristics based on whether the semiconductor pattern is doped. The semiconductor pattern may include a first area having high conductivity and a second area having low conductivity. The first area may be doped with an N-type dopant or a P-type dopant. The P-type transistor may include the doped area doped with a P-type dopant, and the N-type transistor may include the doped area doped with an N-type dopant. The second area may be an undoped area or may be doped with a lower concentration than the first area.

The conductivity of the first area is greater than the conductivity of the second area. The first area may substantially operate as an electrode or signal line. The second area may correspond to a channel area of a transistor substantially. In other words, a part of the semiconductor pattern may be a channel part of the transistor. Another part of the semiconductor pattern may be a source or drain of the transistor. Another part may be a connection electrode or a connection signal line.

Each of the pixels may have an equivalent circuit including a plurality of transistors, at least one capacitor, and a light emitting element. The equivalent circuit of a pixel may be modified in various shapes. A transistor 100PC and a light emitting element 100PE included in a pixel are illustrated in FIG. 5A by way of example.

The transistor 100PC may include a source S1, a channel part CH1, a drain D1, and a gate G1. The source S1, the channel part CH1, and the drain D1 may be formed from the semiconductor pattern. The source S1 and the drain D1 may extend in directions opposite to each other from the channel part CH1 on a cross section. A portion of a connection signal line SCL formed from the semiconductor pattern is illustrated in FIG. 5A. Although not illustrated separately, the connection signal line SCL may be electrically connected to the drain D1 of the transistor 100PC on a plane.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer structure or a multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. Insulating layers of the display circuit layer DP_CL, which is to be described later, as well as the first insulating layer 10 may be an inorganic layer and/or an organic layer, and may have a single-layer structure or a multi-layer structure. The inorganic layer may include at least one of the above-described materials, but is not limited thereto.

The gate G1 is disposed on the first insulating layer 10. The gate G1 may be a part of a metal pattern. The gate G1 overlaps the channel part CH1. In a process of doping the semiconductor pattern, the gate G1 may function as a mask.

A second insulating layer 20 is disposed on the first insulating layer 10 and may cover the gate G1. The second insulating layer 20 may overlap pixels in common. The second insulating layer 20 may be an inorganic layer and/or an organic layer, and may have a single-layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The display element layer DP_ED may be placed on the display circuit layer DP_CL. The display element layer DP_ED may include the light emitting element 100PE and a pixel defining layer 70. For example, the display element layer DP_ED may include an organic luminescent material, an inorganic luminescent material, a quantum dot, a quantum rod, a micro-LED, or a nano-LED. Hereinafter, the description will be given under the condition that the light emitting element 100PE is an organic light emitting element, but an embodiment is not particularly limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 through a contact hole CNT-3 penetrating the sixth insulating layer 60. The first electrode AE may be referred to as an “anode”.

A pixel defining film 70 may be disposed on the sixth insulating layer 60 and may cover a portion of the first electrode AE. An opening 70-OP is defined in the pixel defining film 70. The opening 70-OP of the pixel defining film 70 exposes at least part of the first electrode AE.

The display area DA (see FIG. 2A) may include an emission area PXA and a non-emission area NPXA adjacent to the emission area PXA. The non-emission area NPXA may surround the emission area PXA. In an embodiment, the emission area PXA is defined to correspond to a partial area of the first electrode AE, which is exposed by the opening 70-OP.

The light emitting layer EL may be disposed on the first electrode AE. The light emitting layer EL may be disposed in an area corresponding to the opening 70-OP. That is, the light emitting layer EL may be separately formed on each of pixels. In an example in which the light emitting layers EL are separately formed in each of pixels, each of the light emitting layers EL may emit light of at least one of a blue color, a red color, and a green color. However, embodiments of the present disclosure are not limited thereto. For example, the light emitting layer EL may be connected and provided to each of the pixels in common. In this case, the light emitting layer EL may provide blue light or white light.

The second electrode CE may be disposed on the light emitting layer EL. The second electrode CE may be disposed in a plurality of pixels in common while having an integral shape. The second electrode CE may be referred to as a cathode.

Although not illustrated, a hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels by using an open mask.

The second base layer BS2 may be disposed on the display element layer DP_ED. As an example of the present disclosure, each of the first and second base layers BS1 and BS2 may have a rigid type.

The filling layer FL may be interposed between the first and second base layers BS1 and BS2. The filling layer FL may be placed in a space sealed by a coupling member SLM (see FIG. 4A) between the first and second base layers BS1 and BS2. The filling layer FL may include a thermosetting material.

The input sensing layer ISP may be directly disposed on the display panel DP. For example, the input sensing layer ISP may be directly disposed on the second base layer BS2.

Referring to FIGS. 4B and 5B, the encapsulation layer TFE may be disposed on the display element layer DP_ED. The encapsulation layer TFE may include an inorganic layer, an organic layer, and an inorganic layer, which are sequentially stacked, but layers constituting the encapsulation layer TFE are not limited thereto.

The inorganic layers may protect the display element layer DP_ED from moisture and oxygen, and the organic layer may protect the display element layer DP_ED from a foreign material such as, for example, dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

The input sensing layer ISP_1 may be formed on the display panel DP_1 through sequential processes. In this case, it may be expressed that the input sensing layer ISP_1 is directly disposed on the display panel DP_1 (e.g., the encapsulation layer TFE). The expression “directly disposed” may mean that the third component is not interposed between the input sensing layer ISP_1 and the display panel DP_1. That is, a separate adhesive member or a separate coupling member may not be interposed between the input sensing layer ISP_1 and the display panel DP_1. Alternatively, the input sensing layer ISP_1 may be coupled to the display panel DP_1 through the adhesive member or the coupling member. The adhesive member may include a typical adhesive or a sticking agent.

Referring to FIGS. 5A and 5B, each of the input sensing layers ISP and ISP_1 may include a base insulating layer 201, a first conductive layer 202, an intermediate insulating layer 203, a second conductive layer 204, and a cover insulating layer 205.

The base insulating layer 201 may be an inorganic layer including at least one of silicon nitride, silicon oxynitride, and silicon oxide. Alternatively, the base insulating layer 201 may be an organic layer including an epoxy resin, an acrylate resin, or an imide-based resin. The base insulating layer 201 may have a single-layer structure or may have a multi-layer structure stacked in the third direction DR3.

Each of the first conductive layer 202 and the second conductive layer 204 may have a single-layer structure or may have a multi-layer structure in which layers are stacked in the third direction DR3.

A conductive layer of a single-layer structure may include a metal layer or a transparent conductive layer. The metal layer may include molybdenum, silver, titanium, copper, aluminum, or an alloy thereof. The transparent conductive layer may include transparent conductive oxide such as, for example, indium tin oxide, indium zinc oxide, zinc oxide, or indium zinc tin oxide. Besides, the transparent conductive layer may include a conductive polymer such as, for example, PEDOT, a metal nano wire, graphene, and the like.

A conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

At least one of the intermediate insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least one of the intermediate insulating layer 203 and the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

Figure 6A:
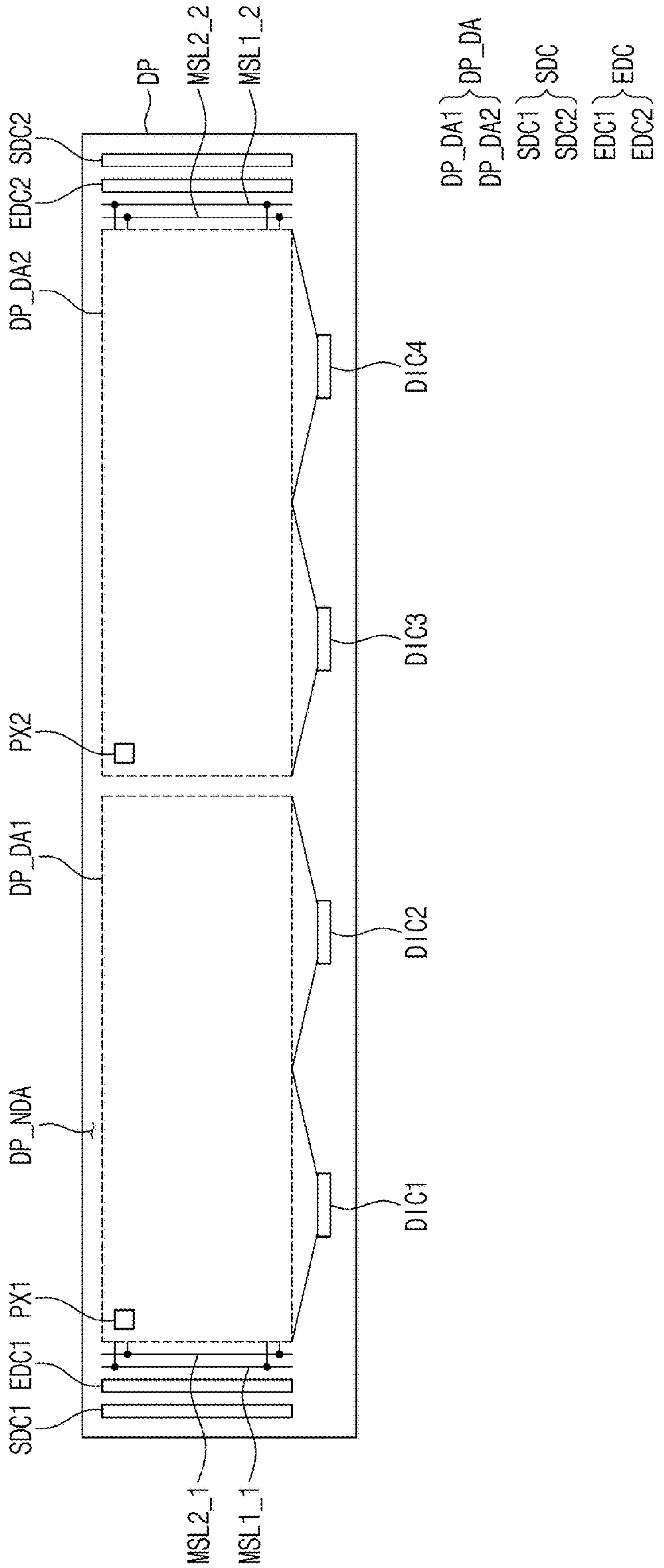
FIG. 6A is a block diagram of a display panel, according to an embodiment of the present disclosure.
Figure 6B:
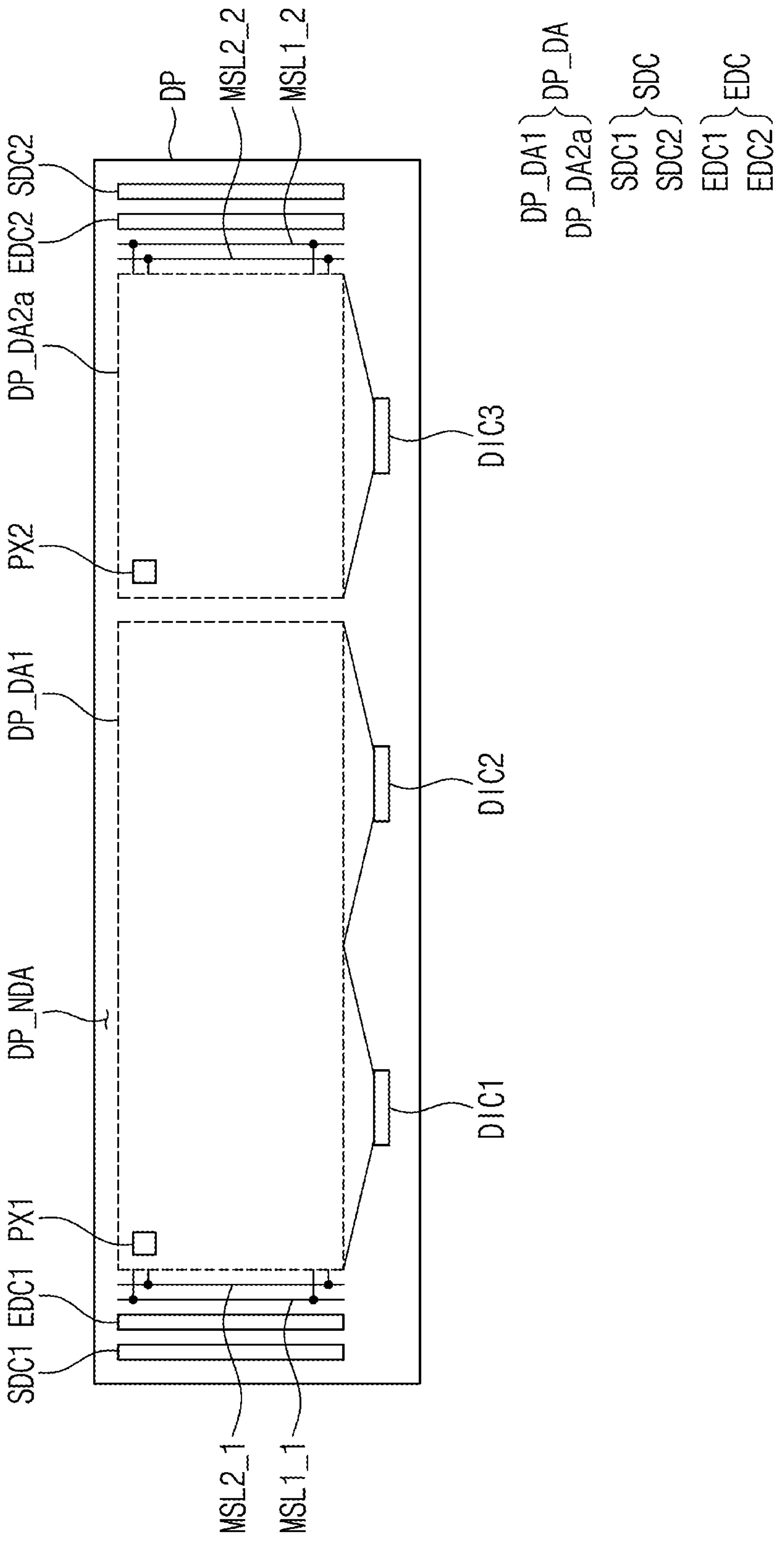
FIG. 6B is a block diagram of a display panel, according to an embodiment of the present disclosure.

FIGS. 6A and 6B are block diagrams of a display panel, according to embodiments of the present disclosure.

Referring to FIG. 6A, the display panel DP may be a configuration that substantially generates an image. The display panel DP may be a light emitting display panel. For example, the display panel DP may be an organic light emitting display panel, a quantum dot display panel, a micro-LED display panel, or a nano-LED display panel.

The display panel DP includes a display area DP_DA and a non-display area DP_NDA adjacent to the display area DP_DA. The display area DP_DA may be an area corresponding to the display area DA illustrated in FIG. 2A. The non-display area DP_NDA may be an area corresponding to the non-display area NDA illustrated in FIG. 2A. The display area DP_DA is an area where an image is actually displayed, and the non-display area DP_NDA is a bezel area in which an image is not displayed.

The display area DP_DA includes a first display area DP_DA1 and a second display area DP_DA2. The first display area DP_DA1 is an area corresponding to the first display area DA1 illustrated in FIG. 2A. The second display area DP_DA2 is an area corresponding to the display area DA illustrated in FIG. 2A. FIG. 6A illustrates a structure in which the non-display area DP_NDA is placed surrounding the first and second display areas DP_DA1 and DP_DA2, but embodiments of the present disclosure are not limited thereto. The non-display area DP_NDA may be placed on only at least one side of the first and second display areas DP_DA1 and DP_DA2.

FIG. 6A illustrates an embodiment in which the size of the first display area DP_DA1 is the same as the size of the second display area DP_DA2, but embodiments of the present disclosure are not limited thereto. For example, the size of the first display area DP_DA1 may be different from the size of the second display area DP_DA2. As illustrated in FIG. 6B, the size of a second display area DP_DA2*a* may be smaller than the size of the first display area DP_DA1.

The display panel DP includes a plurality of pixels and signal lines connected to the plurality of pixels. Each of the pixels may include a light emitting element. The signal lines may include data lines, scan lines, emission control lines, and power source lines. Here, pixels placed in the first display area DP_DA1 are referred to as "first pixels PX1", and pixels placed in the second display area DP_DA2 are referred to as "second pixels PX2". As an example of the present disclosure, the first pixels PX1 and the second pixels PX2 may have the same shape and the same size as each other.

The electronic device DD (see FIG. 2A) further includes a driving circuit for driving the display panel DP. The driving circuit may include a plurality of driver chips, a scan driving circuit SDC and an emission driving circuit EDC. The plurality of driver chips may include first and second driver chips DIC1 and DIC2 connected to the first display area DP_DA1, and third and fourth driver chips DIC3 and DIC4 connected to the second display area DP_DA2. FIG. 6A illustrates a structure in which two driver chips are connected to each of the display areas DP_DA1 and DP_DA2, but embodiments of the present disclosure are not limited thereto. For example, the number of driver chips may vary based on the size and resolution of the display area. As illustrated in FIG. 6B, when the size of the second display area DP_DA2*a* is reduced, only the one third driver chip DIC3 may be connected to the second display area DP_DA2*a*.

The scan driving circuit SDC includes a first scan driving circuit SDC1 connected to the first display area DP_DA1 and the second scan driving circuit SDC2 connected to the second display area DP_DA2. The emission driving circuit EDC includes a first emission driving circuit EDC1 connected to the first display area DP_DA1 and a second emission driving circuit EDC2 connected to the second display area DP_DA2.

As an example of the present disclosure, the first scan driving circuit SDC1 and the first emission driving circuit EDC1 are placed on one side (e.g., left) of the first display area DP_DA1, and the second scan driving circuit SDC2 and the second emission driving circuit EDC2 are arranged on one side (e.g., right) of the second display area DP_DA2. Alternatively, the first scan driving circuit SDC1 and the first emission driving circuit EDC1 may be respectively placed on both sides of the first display area DP_DA1, and the second scan driving circuit SDC2 and the second emission driving circuit EDC2 may be respectively placed on both sides of the second display area DP_DA2.

A (1-1)-th switching line MSL1_1 and a (2-1)-th switching line MSL2_1 are placed on one side (e.g., left) of the first display area DP_DA1. A (1-2)-th switching line MSL1_2 and a (2-2)-th switching line MSL2_2 are placed on one side (e.g., right) of the second display area DP_DA2. The (1-1)-th switching line MSL1_1 and the (2-1)-th switching line MSL2_1 are connected to the first pixels PX1, and the (1-2)-th switching line MSL1_2 and the (2-2)-th switching line MSL2_2 are connected to the second pixels PX2.

The (1-1)-th switching line MSL1_1 and the (2-1)-th switching line MSL2_1 may respectively receive first and second switching signals MS1 and MS2 (see FIG. 7) from a driving controller T_CON (see FIG. 11A) that controls the driving of the scan driving circuit SDC and the emission driving circuit EDC. The (1-2)-th switching line MSL1_2 and the (2-2)-th switching line MSL2_2 may receive the first and second switching signals MS1 and MS2 (see FIG. 7) from the driving controller T_CON, respectively.

Figure 7:
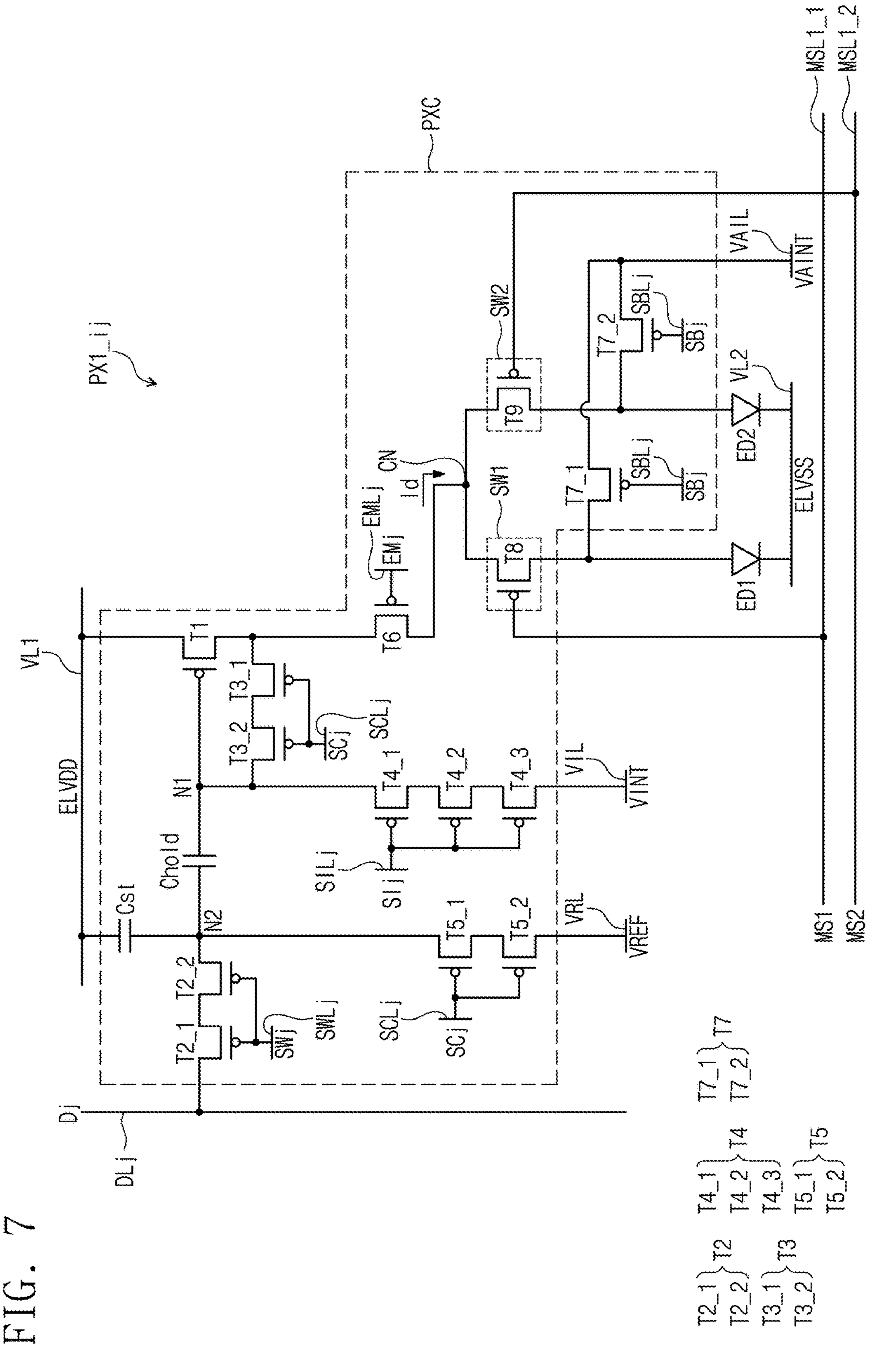
FIG. 7 is a circuit diagram of a first pixel, according to an embodiment of the present disclosure.
Figure 8:
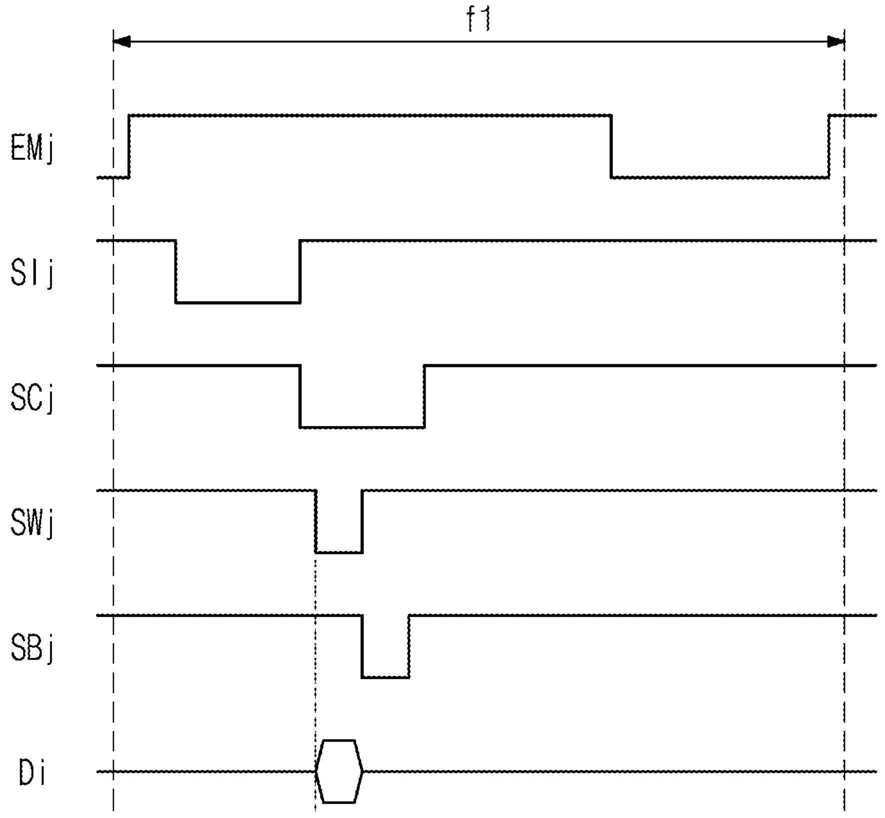
FIG. 8 is a waveform diagram for describing an operation of the first pixel illustrated in FIG. 7.

FIG. 7 is a circuit diagram of a first pixel, according to an embodiment of the present disclosure. FIG. 8 is a waveform diagram for describing an operation of the first pixel illustrated in FIG. 7. FIG. 7 illustrates an equivalent circuit diagram of one first pixel PX1_*ij* among a plurality of first pixels PX1 illustrated in FIG. 6A. Because each of the plurality of first pixels has the same circuit structure, a detailed description of the remaining first pixels will be replaced with a description of a circuit structure of the first pixel PX1_*ij*.

Referring to FIG. 7, the first pixel PX1_*ij* is connected to an i-th data line DLi (hereinafter referred to as a "data line") among data lines, connected to a j-th initialization scan line SILj (hereinafter referred to as an "initialization scan line"), a j-th compensation scan line SCLj (hereinafter referred to as a "compensation scan line"), a j-th write scan line SWLj (hereinafter referred to as a "write scan line"), and a j-th black scan line SBLj (hereinafter referred to as a "black scan line") among scan lines, and connected to a j-th emission control line EMLj (hereinafter referred to as an "emission control line") among emission control lines. As an example of the present disclosure, the first pixel PX1_*ij* is connected to the 1-1st switching line MSL1_1 and the 2-1st switching line MSL2_1.

The first pixel PX1_*ij* includes a first light emitting element ED1, a second light emitting element ED2, and a pixel circuit unit PXC. The pixel circuit unit PXC includes first to ninth transistors T1, T2, T3, T4, T5, T6, T7, T8, and T9 and first and second capacitors Cst and Chold. Each of the first to ninth transistors T1 to T9 may be a transistor having a low-temperature polycrystalline silicon (LTPS) semiconductor layer. All of the first to ninth transistors T1 to T9 may be P-type transistors. However, embodiments of the present disclosure are not limited thereto. For example, all of the first to ninth transistors T1 to T9 may be N-type transistors. In an embodiment, some of the first to ninth transistors T1 to T9 may be P-type transistors, and the other(s) of the first to ninth transistors T1 to T9 may be N-type transistors. For example, among the first to ninth transistors T1 to T9, the first, second, and fifth to ninth transistors T1, T2, and T5 to T9 are P-type transistors, and the third and fourth transistors T3 and T4 may be N-type transistors by using an oxide semiconductor as a semiconductor layer. However, a configuration of the pixel circuit unit PXC according to an embodiment of the present disclosure is not limited to an embodiment illustrated in FIG. 7. The pixel circuit unit PXC illustrated in FIG. 7 is an example. For example, the configuration of the pixel circuit unit PXC may be modified and implemented. For example, all of the first to ninth transistors T1 to T9 may be P-type transistors or N-type transistors.

The initialization scan line SILj may apply the j-th initialization scan signal SIj (hereinafter referred to as an "initialization scan signal") to the pixel PXij; the compensation scan line SCLj may apply the j-th compensation scan signal SCj (hereinafter referred to as a "compensation scan signal") to the pixel PXij; the write scan line SWLj may apply the j-th write scan signal SWj (hereinafter referred to as a "write scan signal") to the pixel PXij; the black scan line SBLj may apply the j-th black scan signal SBj (hereinafter referred to as a "black scan signal") to the pixel PXij; and, the emission control line EMLj may apply the j-th emission control signal EMj (hereinafter referred to as an "emission control signal") to the pixel PXij. The data line DLi applies a data signal Di to the pixel PXij. The (1-1)-th switching line MSL1_1 may apply the first switching signal MS1 to the first pixel PX1_*ij*. The (2-1)-th switching line MSL2_1 may apply the second switching signal MS2 to the first pixel PX1_*ij*.

The first and second driving voltage lines VL1 and VL2 may supply a first driving voltage ELVDD and a second driving voltage ELVSS to the first pixel PX1_*ij*, respectively. The first pixel PX1_*ij* may receive a first initialization voltage VINT and a second initialization voltage AINT through the first and second initialization voltage lines VIL and VAIL, respectively. The first pixel PX1_*ij* may further receive a reference voltage VREF through a reference voltage line VRL. FIG. 7 illustrates a structure in which five voltage lines are connected to the first pixel PX1_*ij*, but the number of voltage lines connected to the first pixel PX1_*ij* may be changed in various ways.

The first transistor T1 includes a first electrode connected to a first driving voltage line VL1, a second electrode electrically connected to a common node CN via the sixth transistor T6, and a gate electrode connected to a first end of the second capacitor Chold (also referred to as a "first node N1"). The first transistor T1 may receive the data signal Di delivered through the data line DLi based on the switching operation of the second transistor T2 and then may supply a driving current Id to the common node CN.

The second transistor T2 may include a (2-1)-th transistor T2_1 and a (2-2)-th transistor T2_2. The 2-1st transistor T2_1 includes a first electrode connected to the data line DLi, a second electrode connected to a first electrode of the (2-2)-th transistor T2_2, and a gate electrode connected to the write scan line SWLj. The (2-2)-th transistor T2_2 includes a first electrode connected to the second electrode of the (2-1)-th transistor T2_1, a second electrode connected to a second end of the second capacitor Chold (or referred to as a "second node N2"), and a gate electrode connected to the write scan line SWLj. The (2-1)-th and (2-2)-th transistors T2_1 and T2_2 may be turned on in response to the write scan signal SWj received through the write scan line SWLj to deliver the data signal Di delivered from the data line DLi to the gate electrode of the first transistor T1.

A first end of the first capacitor Cst is connected to the second node N2, and a second end of the first capacitor Cst is connected to the first driving voltage line VL1.

The third transistor T3 may include a (3-1)-th transistor T3_1 and a (3-2)-th transistor T3_2. The (3-1)-th transistor T3_1 includes a first electrode connected to the second electrode of the first transistor T1, a second electrode connected to a first electrode of the (3-2)-th transistor T3_2, and a gate electrode connected to the compensation scan line SCLj. The (3-2)-th transistor T3_2 includes a first electrode connected to the second electrode of the (3-1)-th transistor T3_1, a second electrode connected to the gate electrode of the first transistor T1 (i.e., the first node N1), and a gate electrode connected to the compensation scan line SCLj. The (3-1)-th and (3-2)-th transistor T3_1 and T3_2 may be turned on in response to the compensation scan signal SCj received through the compensation scan line SCLj, and thus, the gate electrode and the second electrode of the first transistor T1 may be connected, that is, the first transistor T1 may be diode-connected.

The fourth transistor T4 may include a (4-1)-th transistor T4_1, a (4-2)-th transistor T4_2, and a (4-3)-th transistor T4_3. The (4-1)-th transistor T4_1, the (4-2)-th transistor T4_2, and the (4-3)-th transistor T4_3 may be connected in series between the first node N1 and the first initialization voltage line VIL. The gate electrode of each of the (4-1)-th transistor T4_1, the (4-2)-th transistor T4_2, and the (4-3)-th transistor T4_3 is commonly connected to the initialization scan line SILj to receive the initialization scan signal SIj. In an example in which the (4-1)-th transistor T4_1, the (4-2)-th transistor T4_2, and the (4-3)-th transistor T4_3 are turned on in response to the initialization scan signal SIj, the gate electrode (i.e., the first node N1) of the first transistor T1 may be initialized to the first initialization voltage VINT.

The fifth transistor T5 may include a (5-1)-th transistor T5_1 and a (5-2)-th transistor T5_2. The (5-1)-th transistor T5_1 and the (5-2)-th transistor T5_2 may be connected in series between the second node N2 and the reference voltage line VRL. The gate electrode of each of the (5-1)-th transistor T5_1 and the (5-2)-th transistor T5_2 is commonly connected to the compensation scan line SCLj to receive the compensation scan signal SCj. In an example in which the (5-1)-th transistor T5_1 and the (5-2)-th transistor T5_2 are turned on in response to the compensation scan signal SCj, the second node N2 may be initialized to the reference voltage VREF.

The sixth transistor T6 (or referred to as an "emission control transistor") includes a first electrode connected to the second electrode of the first transistor T1, a second electrode connected to the common node CN, and a gate electrode connected to the emission control line EMLj.

The sixth transistor T6 is turned on in response to the emission control signal EMj received through the emission control line EMLj. The driving current Id may be delivered to the common node CN through the turned-on sixth transistor T6.

The seventh transistor T7 may include a (7-1)-th transistor T7_1 and a (7-2)-th transistor T7_2. The (7-1)-th transistor T7_1 (or referred to as a "first initialization transistor") includes a first electrode connected to an anode of the first light emitting element ED1, a second electrode connected to the second initialization voltage line VAIL, and a gate electrode connected to the black scan line SBLj. The (7-2)-th transistor T7_2 (or referred to as a "second initialization transistor") includes a first electrode connected to an anode of the second light emitting element ED2, a second electrode connected to the second initialization voltage line VAIL, and a gate electrode connected to the black scan line SBLj. The gate electrode of each of the (7-1)-th transistor T7_1 and the (7-2)-th transistor T7_2 is commonly connected to the black scan line SBLj to receive the black scan signal SBj. In an example in which the (7-1)-th transistor T7_1 and the (7-2)-th transistor T7_2 are turned on in response to the black scan signal SBj, the anodes of the first and second light emitting elements ED1 and ED2 may be initialized to the second initialization voltage VAINT.

The cathode of each of the first and second light emitting elements ED1 and ED2 may be connected to the second driving voltage line VL2 that delivers the second driving voltage ELVSS.

The first switching circuit SW1 is placed between the common node CN and the first light emitting element ED1, and the second switching circuit SW2 is placed between the common node CN and the second light emitting element ED2. As an example of the present disclosure, the first switching circuit SW1 includes the eighth transistor T8, and the second switching circuit SW2 includes the ninth transistor T9. The eighth transistor T8 may be referred to as a "first mode switching transistor", and the ninth transistor T9 may be referred to as a "second mode switching transistor". The eighth transistor T8 includes a first electrode connected to the common node CN, a second electrode connected to the anode of the first light emitting element ED1, and a gate electrode connected to the (1-1)-th switching line MSL1_1. The ninth transistor T9 includes a first electrode connected to the common node CN, a second electrode connected to the anode of the second light emitting element ED2, and a gate electrode connected to the (1-2)-th switching line MSL1_2.

In the first mode, the eighth transistor T8 may be turned on in response to the first switching signal MS1 transmitted through the (1-1)-th switching line MSL1_1, and the first light emitting element ED1 may receive the driving current Id through the turned-on eighth transistor T8. In the first mode, the ninth transistor T9 may be turned off, and thus the driving current Id may be provided to only the first light emitting element ED1. In the first mode, all of the eighth transistors T8 of the first pixels PX1 (see FIG. 6A) may be turned on in response to the first switching signal MS1. In the second mode, all of the ninth transistors T9 of the first pixels PX1 may be turned off in response to the second switching signal MS2. In the second mode, the ninth transistor T9 may be turned on in response to the second switching signal MS2 transmitted through the (1-2)-th switching line MSL1_2, and the second light emitting element ED2 may receive the driving current Id through the turned-on ninth transistor T9. In the second mode, the eighth transistor T8 is turned off, and thus the driving current Id may be provided to only the second light emitting element ED2. In the second mode, all of the ninth transistors T9 of the first pixels PX1 may be turned on in response to the second switching signal MS2. In the second mode, all of the eighth transistors T8 of the first pixels PX1 may be turned off in response to the first switching signal MS1.

The first pixel PX1_*ij* may display an image through the first light emitting element ED1 in the first mode, and may display an image through the second light emitting element ED2 in the second mode. However, embodiments of the present disclosure are not limited thereto. Alternatively, the first pixel PX1_*ij* may display an image by using the first and second light emitting elements ED1 and ED2 in the first mode, and may display an image by using only the second light emitting element ED2 in the second mode. In this case, in the first mode, the eighth and ninth transistors T8 and T9 may be turned on simultaneously.

Referring to FIGS. 7 and 8, when the initialization scan signal SIj having a low level is provided through the initialization scan line SILj during the initialization period of one frame f1, the (4-1)-th, (4-2)-th, and (4-3)-th transistors T4_1, T4_2, and T4_3 are turned on in response to the initialization scan signal SIj having the low level. The first initialization voltage VINT is delivered to the gate electrode of the first transistor T1 (i.e., the first node N1) through the turned-on (4-1)-th, (4-2)-th, and (4-3)-th transistors T4_1, T4_2, and T4_3, and the gate electrode of the first transistor T1 is initialized by the first initialization voltage VINT.

Next, when the compensation scan signal SCj of a low level is supplied through the compensation scan line SCLj during the compensation period of the one frame f1, the (3-1)-th and (3-2)-th transistors T3_1 and T3_2 are turned on. A compensation period may not overlap an initialization section. The activation section of the compensation scan signal SCj is defined as a section in which the compensation scan signal SCj has a low level. The activation section of the initialization scan signal SIj is defined as a section in which the initialization scan signal SIj has a low level. The activation section of the compensation scan signal SCj may not overlap the activation section of the initialization scan signal SIj. The activation section of the initialization scan signal SIj may precede the activation section of the compensation scan signal SCj.

During the compensation period, the first transistor T1 is diode-connected by the turned-on (3-1)-th and (3-2)-th transistors T3_1 and T3_2 and is forward-biased. Moreover, the compensation period may include a data write period in which the write scan signal SWj is generated to have a low level. During the data write period, the (2-1)-th and (2-2)-th transistors T2_1 and T2_2 are turned on by the write scan signal SWj having the low level. Then, a compensation voltage "Di−Vth" obtained by reducing the voltage of the data signal Di supplied from the data line DLi by the threshold voltage Vth of the first transistor T1 is applied to the gate electrode of the first transistor T1. That is, the potential of the gate electrode of the first transistor T1 may be the compensation voltage "Di−Vth".

The first driving voltage ELVDD and the data signal Di may be respectively applied to opposite ends of the first capacitor Cst, and charges corresponding to a voltage difference between the opposite ends of the first capacitor Cst may be stored in the first capacitor Cst.

In the meantime, the (7-1)-th and (7-2)-th transistors T7_1 and T7_2 are turned on by receiving the black scan signal SBj of a low-level through the black scan line SBLj. A portion of the driving current Id may be drained through the (7-1)-th and (7-2)-th transistor T7_1 and T7_2 as a bypass current.

Next, the emission control signal EMj supplied from the emission control line EMLj is changed from a high level to a low level. The sixth transistor T6 is turned on by the emission control signal EMj having a low level. Accordingly, the driving current Id according to a voltage difference between the gate voltage of the gate electrode of the first transistor T1 and the first driving voltage ELVDD may be generated and provided to the common node CN through the sixth transistor T6. The driving current Id may be provided to the first light emitting element ED1 or the second light emitting element ED2 through the eighth or ninth transistor T8 or T9 turned on based on a mode.

The circuit structure of the first pixels PX1 may be identical to the circuit structure of the second pixels PX2 (see FIG. 6A). However, the first and second switching circuits SW1 and SW2 of the second pixel PX2 are respectively connected to the (2-1)-th switching line MSL2_1 and the (2-2)-th switching line MSL2_2 to receive the first and second switching signals MS1 and MS2, respectively.

Figure 9A:
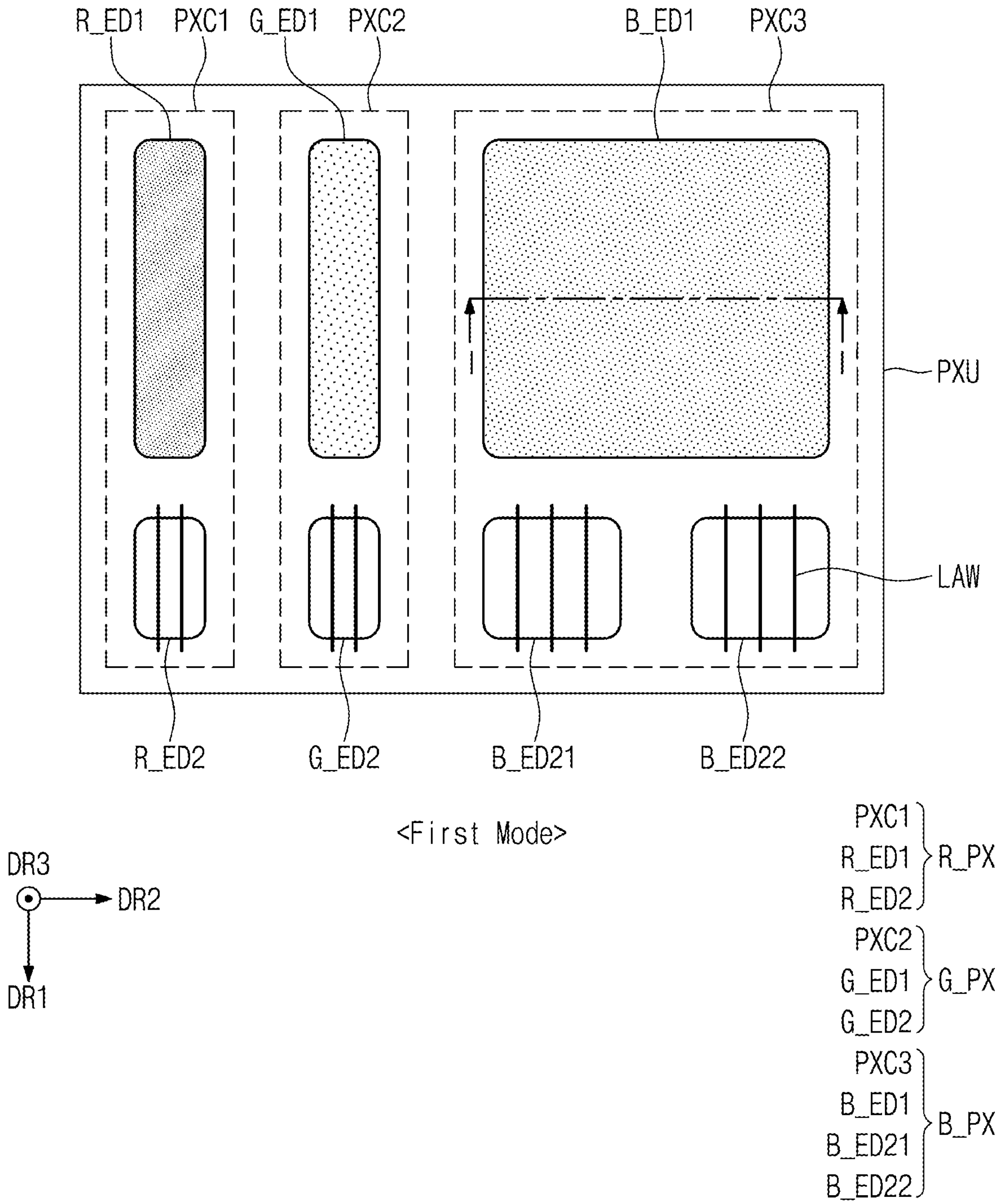
FIG. 9A is a diagram illustrating a state, in which wide pixels are turned on in a first mode, according to an embodiment of the present disclosure.
Figure 9B:
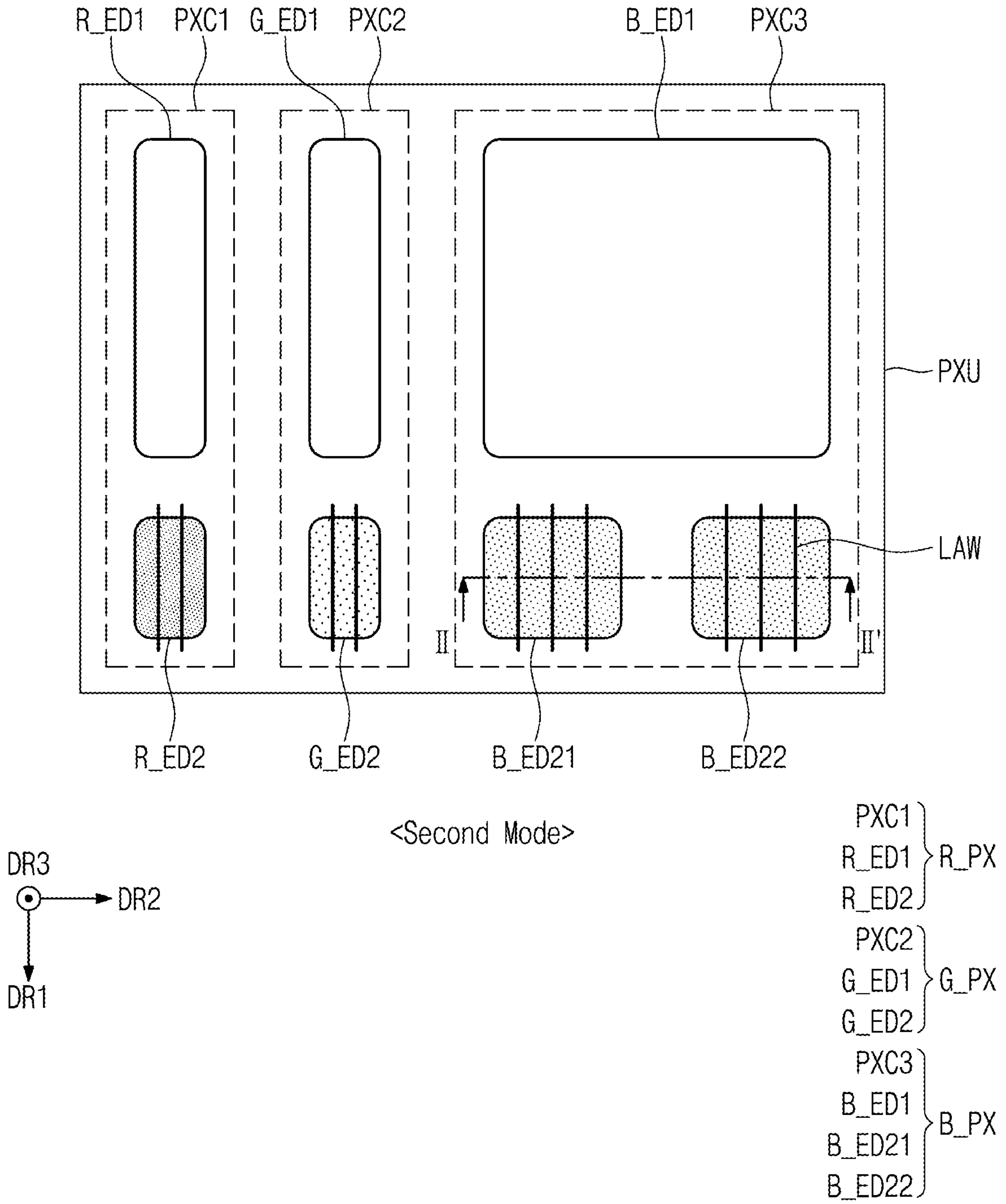
FIG. 9B is a diagram illustrating a state, in which narrow pixels are turned on in the second mode, according to an embodiment of the present disclosure.
Figure 10A:
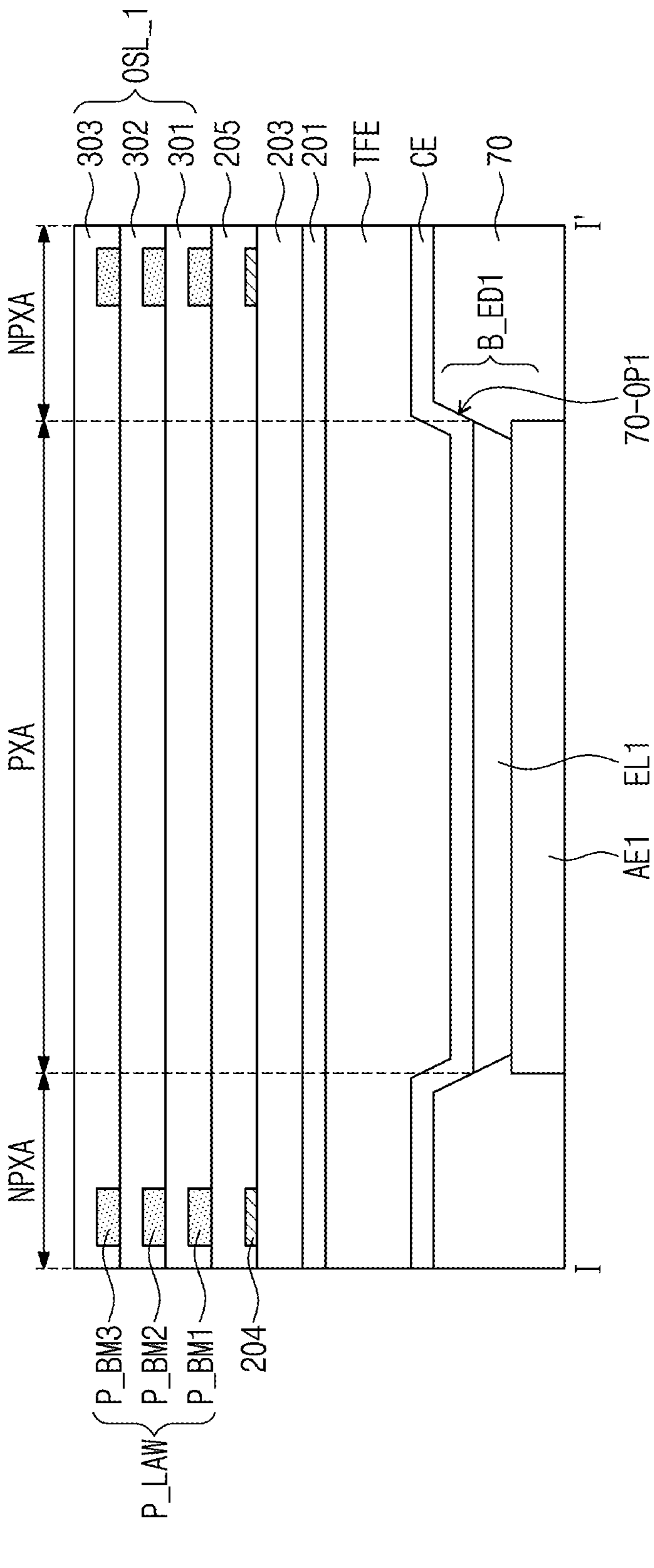
FIG. 10A is a cross-sectional view taken along a cutting line I-I' illustrated in FIG. 9A.
Figure 10B:
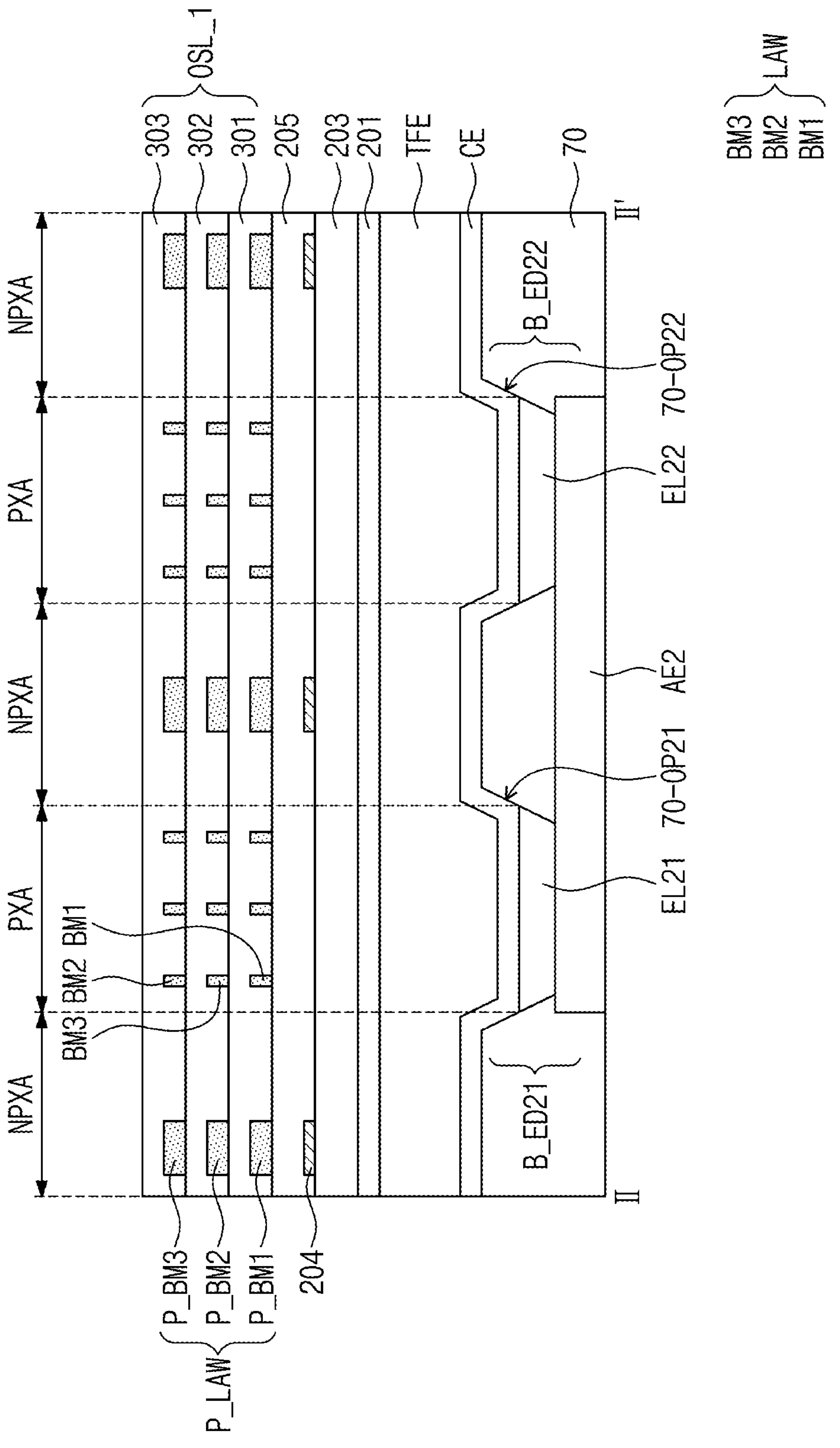
FIG. 10B is a cross-sectional view taken along a cutting line II-II' illustrated in FIG. 9B.

FIG. 9A is a diagram illustrating a state in which a wide light emitting element is turned on in a first mode, according to an embodiment of the present disclosure. FIG. 9B is a diagram illustrating a state in which a narrow light emitting element is turned on in a second mode, according to an embodiment of the present disclosure. FIG. 10A is a cross-sectional view taken along a cutting line I-I' illustrated in FIG. 9A. FIG. 10B is a cross-sectional view taken along a cutting line II-II' illustrated in FIG. 9B.

Referring to FIGS. 9A and 9B, the plurality of first pixels PX1 (see FIG. 6A) may be placed in units of a pixel cell PXU in the first display area DA1 (see FIG. 6A), and the plurality of second pixels PX2 (see FIG. 6A) may be placed in units of a pixel cell PXU in the second display area DA2 (see FIG. 6A).

As an example of the present disclosure, the pixel cell PXU may include a red pixel R_PX, a green pixel G_PX, and a blue pixel B_PX. The red pixel R_PX includes a red pixel circuit PXC1, a first red light emitting element R_ED1, and a second red light emitting element R_ED2. The green pixel G_PX includes a green pixel circuit PXC2, a first green light emitting element G_ED1, and a second green light emitting element G_ED2. The blue pixel B_PX includes a blue pixel circuit PXC3, a first blue light emitting element B_ED1, a (2-1)-th blue light emitting element B_ED21, and a (2-2)-th blue light emitting element B_ED22. Here, the first red light emitting element R_ED1, the first green light emitting element G_ED1, and the first blue light emitting element B_ED1 may be referred to as "wide light emitting elements". The second red light emitting element R_ED2, the second green light emitting element G_ED2, and the (2-1)-th and (2-2)-th blue light emitting elements B_ED21 and B_ED22 may be referred to as "narrow light emitting elements".

As an example of the present disclosure, the first red light emitting element R_ED1 may have a size larger than the second red light emitting element R_ED2. The first green light emitting element G_ED1 may have a size larger than the second green light emitting element G_ED2. The first blue light emitting element B_ED1 may have a size larger than the (2-1)-th blue light emitting element B_ED21 and the (2-2)-th blue light emitting element B_ED22. The (2-1)-th blue light emitting element B_ED21 and the (2-2)-th blue light emitting element B_ED22 may have the same size as each other.

Although FIGS. 9A and 9B illustrate that the wide light emitting element has a size larger than the narrow light emitting element, embodiments of the present disclosure are not limited thereto. For example, the first red light emitting element R_ED1 may have the same size as the second red light emitting element R_ED2. The first green light emitting element G_ED1 may have the same size as the second green light emitting element G_ED2.

A plurality of light absorption walls LAW may be formed on the narrow light emitting element. The plurality of light absorption walls LAW may overlap the narrow light emitting element and may not overlap the wide light emitting element. The plurality of light absorption walls LAW may be a configuration included in the optical path control layers OSL and OSL_1 illustrated in FIGS. 4A to 5B. As an example of the present disclosure, the plurality of light absorption walls LAW may overlap emission areas respectively corresponding to the second red light emitting element R_ED2, the second green light emitting element G_ED2, the (2-1)-th and (2-2)-th blue light emitting elements B_ED21 and B_ED22. As an example of the present disclosure, each of the plurality of light absorption walls LAW may extend in the first direction DR1. The plurality of light absorption walls LAW may be spaced from each other in the second direction DR2. The light absorption walls LAW may absorb some of light (i.e., referred to as "lateral light"), which propagates in a lateral direction, from among light output from the second red light emitting element R_ED2, the second green light emitting element G_ED2, the (2-1)-th and (2-2)-th blue light emitting elements B_ED21 and B_ED22. The lateral light may refer to light emitted in a direction, which is inclined at a specific angle or more with respect to a normal line perpendicular to a light emitting surface of the narrow light emitting element.

In the first mode, the pixel cell PXU may display an image by using the wide light emitting element. In the second mode, the pixel cell PXU may display an image by using a narrow light emitting element. In the first mode, the lateral light of the light output through the narrow light emitting element may be absorbed through the light absorption walls LAW, and thus the viewing angle of an image displayed in the second mode may be narrower than the viewing angle of an image displayed in the first mode. Accordingly, when the first display area DP_DA1 operates in the second mode, the front passenger FP (see FIG. 3A) may not perceive the first image IM1 (see FIG. 3A). In an example in which the second display area DP_DA2 operates in the second mode, the driver DV (see FIG. 2A) may not perceive the second image IM2 (see FIG. 3A).

In the first mode, when the first switching signal MS1 is activated, the red pixel R_PX, the green pixel G_PX, and the blue pixel B_PX may display an image by using the first red light emitting element R_ED1, the first green light emitting element G_ED1, and the first blue light emitting element B_ED1. In the first mode, the second switching signal MS2 is inactive, and thus the second red light emitting element R_ED2, the second green light emitting element G_ED2, the (2-1)-th and (2-2)-th blue light emitting elements B_ED21 and B_ED22 are turned off.

In the meantime, when the second switching signal MS2 is activated in the second mode, the red pixel R_PX, the green pixel G_PX, and the blue pixel B_PX may display an image by using the second red light emitting element R_ED2, the second green light emitting element G_ED2, the (2-1)-th and (2-2)-th blue light emitting elements B_ED21 and B_ED22. In the second mode, the first switching signal MS1 is inactive, and thus the first red light emitting element R_ED1, the first green light emitting element G_ED1, and the first blue light emitting element B_ED1 are turned off.

Referring to FIGS. 10A and 10B, the first blue light emitting element B_ED1 includes a first blue anode AE1, a first blue light emitting layer EL1, and the cathode CE. The pixel defining film 70 is provided to a first blue opening 70-OP1 that exposes the first blue anode AE1, and the first blue light emitting layer EL1 is placed on the first blue anode AE1 exposed through the first blue opening 70-OP1.

The (2-1)-th blue light emitting element B_ED21 includes a second blue anode AE2, a (2-1)-th blue light emitting layer EL21, and the cathode CE. The (2-2)-th blue light emitting element B_ED22 includes the second blue anode AE2, a (2-2)-th blue light emitting layer EL22, and the cathode CE. The pixel defining film 70 is provided with (2-1)-th and (2-2)-th blue openings 70-OP21 and 70-OP22 that expose the second blue anode AE2. The (2-1)-th blue light emitting layer EL21 is placed on the second blue anode AE2 exposed through the (2-1)-th blue opening 70-OP21, and the (2-2)-th blue light emitting layer EL22 is placed on the second blue anode AE2 exposed through the (2-2)-th blue opening 70-OP22.

The cathode CE is disposed on the first blue light emitting layer EL1, the (2-1)-th blue light emitting layer EL21, and the 2-2nd blue light emitting layer EL22. The cathode CE is covered by the encapsulation layer TFE.

The base insulating layer 201, the intermediate insulating layer 203, and the cover insulating layer 205 may be sequentially stacked on the encapsulation layer TFE. The second conductive layer 204 may be placed in the non-emission area NPXA. The first conductive layer 202 (see FIGS. 5A and 5B) may be further disposed in the non-emission area NPXA.

The optical path control layer OSL_1 may be disposed on the cover insulating layer 205. The optical path control layer OSL_1 may include a plurality of light absorption walls LAW placed to correspond to the emission area PXA of the narrow light emitting element. Because the first blue light emitting element B_ED1 belongs to the wide light emitting element, the plurality of light absorption walls LAW are not disposed on the first blue light emitting element B_ED1. In the meantime, the (2-1)-th blue light emitting element B_ED21 and the (2-2)-th blue light emitting element B_ED22 belong to the narrow light emitting element, and thus the plurality of light absorption walls LAW are placed on the (2-1)-th blue light emitting element B_ED21 and the (2-2)-th blue light emitting element B_ED22.

As an example of the present disclosure, each of the plurality of light absorption walls LAW may include a plurality of black matrices. FIGS. 10A and 10B illustrate a structure in which each of the plurality of light absorption walls LAW is composed of three black matrices (hereinafter, referred to as first to third black matrices BM1, BM2, and BM3), but the structure of each of the plurality of light absorption walls LAW is not limited thereto. For example, each of the plurality of light absorption walls LAW may be composed of one black matrix, or may be composed of two matrices or four or more black matrices.

The first black matrix BM1 may be placed on the cover insulating layer 205 and may be covered by a first transparent insulating layer 301. The second black matrix BM2 may be placed on the first transparent insulating layer 301 and may be covered by a second transparent insulating layer 302. The third black matrix BM3 may be placed on the second transparent insulating layer 302 and may be covered by a third transparent insulating layer 303. Each of the first to third black matrices BM1, BM2, and BM3 may include a light absorbing material or a light blocking material. Accordingly, light incident on the first to third black matrices BM1, BM2, and BM3 may not be reflected but may be absorbed. Each of the first transparent insulating layer 301, second transparent insulating layer 302, and third transparent insulating layer 303 may include a transparent organic material.

The light emission range of the light output from the 2-1st blue light emitting element B_ED21 and the 2-2nd blue light emitting element B_ED22 may be controlled by the plurality of light absorption walls LAW. In other words, the lateral light among light output from the (2-1)-th and (2-2)-th blue light emitting elements B_ED21 and B_ED22 is absorbed by the light absorption walls LAW and is not output to the outside. The light emission range of the light output from the (2-1)-th blue light emitting element B_ED21 and the (2-2)-th blue light emitting element B_ED22 may be narrowed by the light absorption walls LAW, and thus the viewing angle of an image displayed in the display area DA (see FIG. 2A) in the second mode may be narrowed.

The optical path control layer OSL_1 may further include a peripheral wall P_LAW placed to correspond to the non-emission area PXA. The peripheral wall P_LAW may have a structure including a plurality of peripheral black matrices P_BM1, P_BM2, and P_BM3. Alternatively, the peripheral wall P_LAW in the optical path control layer OSL_1 may be omitted.

Figure 11A:
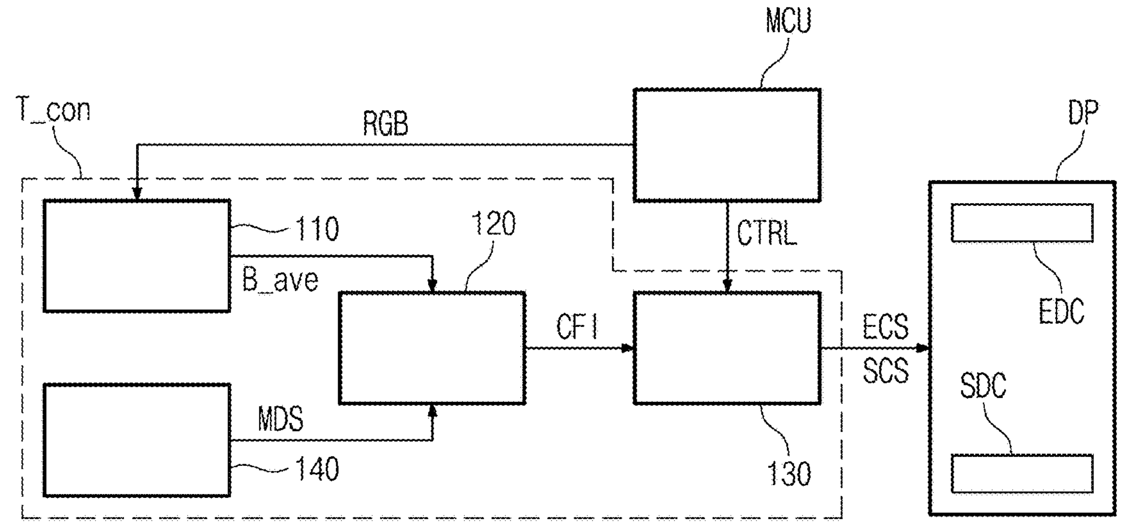
FIG. 11A is a block diagram of a driving controller, according to an embodiment of the present disclosure.
Figure 11B:
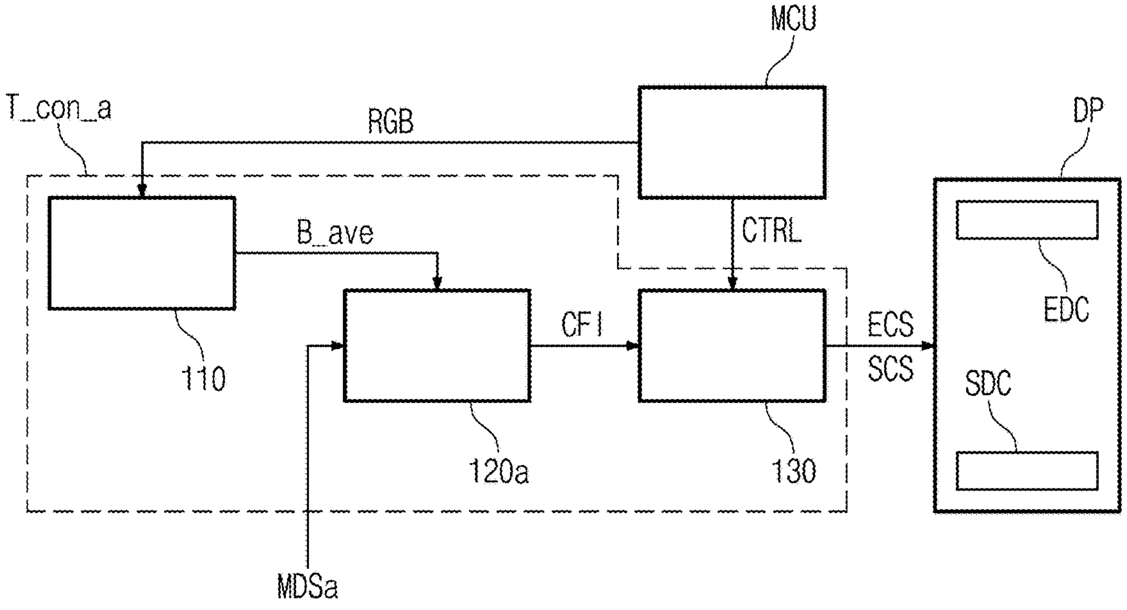
FIG. 11B is a block diagram of a driving controller, according to an embodiment of the present disclosure.
Figure 12A:
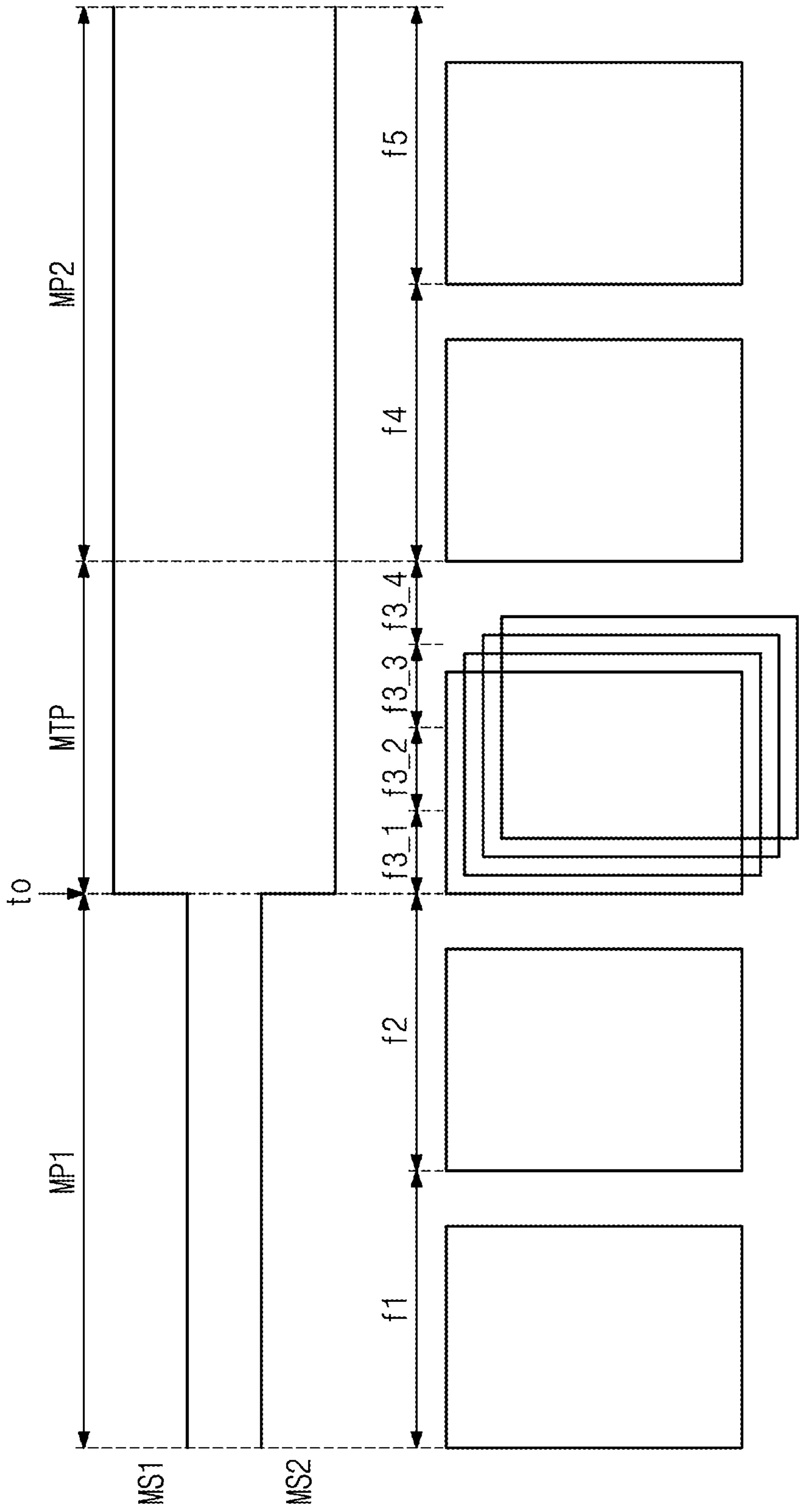
FIG. 12A is a waveform diagram illustrating first and second switching signals, a driving of a display panel, and a compensation frequency, according to an embodiment of the present disclosure.
Figure 12B:
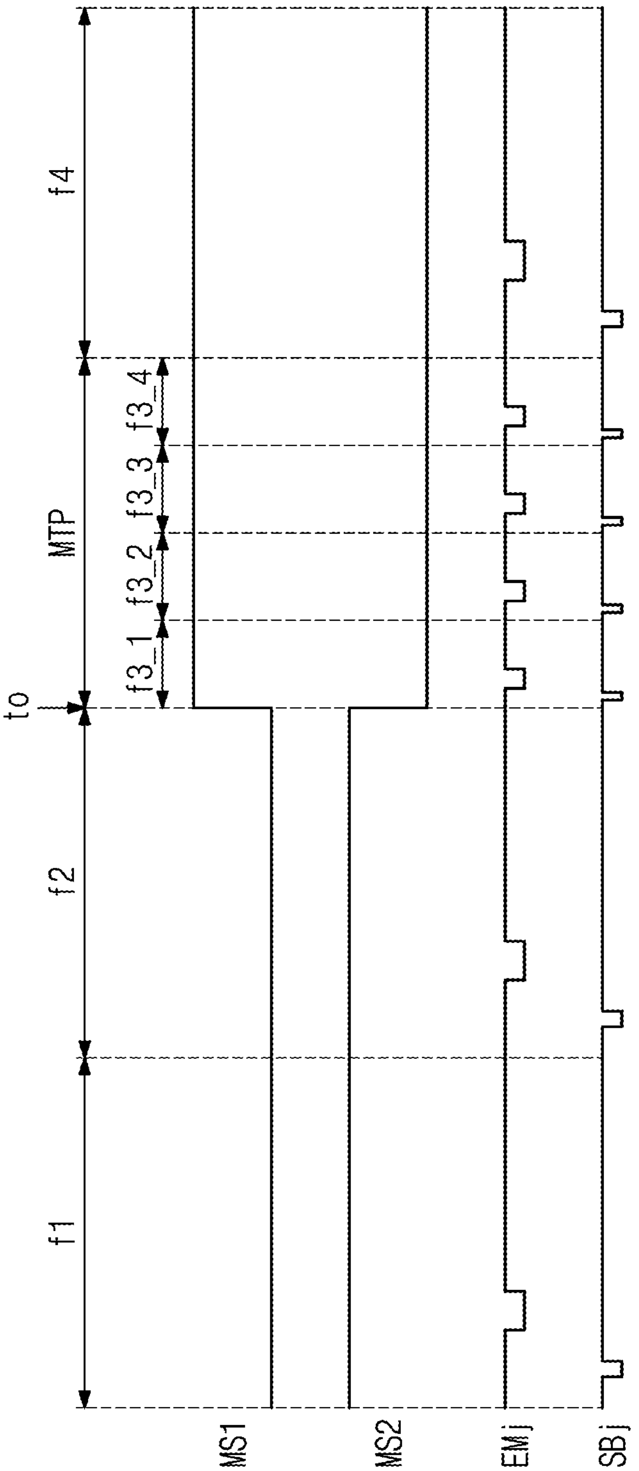
FIG. 12B is a waveform diagram illustrating a state, in which frequencies of an emission control signal and a black scan signal are varied from a driving frequency to a compensation frequency in a mode switching period, according to an embodiment of the present disclosure.

FIGS. 11A and 11B are block diagrams of a driving controller, according to embodiments of the present disclosure. FIG. 12A is a waveform diagram illustrating first and second switching signals, a driving of a display panel, and a compensation frequency, according to an embodiment of the present disclosure. FIG. 12B is a waveform diagram illustrating a state, in which frequencies of an emission control signal and a black scan signal are varied from a driving frequency to a compensation frequency in a mode switching period, according to an embodiment of the present disclosure.

Referring to FIGS. 11A and 11B, a driving controller T_con receives an input image signal RGB and a control signal CTRL from a main processor MCU (e.g., a microcontroller or a graphics controller). The driving controller T_con generates image data by converting an input image signal RGB and generates a driving control signal based on a control signal CTRL. The image data may be provided to a plurality of driver chips. The driving control signal may be a control signal for controlling an operation of a driving circuit (i.e., the plurality of driver chips DIC1 to DIC4 (see FIG. 6A), the scan driving circuit SDC (see FIG. 6A), and the emission driving circuit EDC (see FIG. 6A)). In an example in which the plurality of driver chips DIC1 to DIC4, the scan driving circuit SDC, and the emission driving circuit EDC are mounted or integrated on the display panel DP, the driving control signal may be applied to the display panel DP through a flexible circuit film.

Referring to FIG. 12A, in a first mode, the first switching signal MS1 has an active state (e.g., a low level), and the second switching signal MS2 has an inactive state (e.g., a high level). In the second mode, the first switching signal MS1 has an inactive state (e.g., a high level), and the second switching signal MS2 has an active state (e.g., a low level). Because the eighth and ninth transistors T8 and T9 illustrated in FIG. 7 are P-type transistors, active states of the first and second switching signals MS1 and MS2 are defined as low levels. However, when the eighth and ninth transistors T8 and T9 are N-type transistors, the active states of the first and second switching signals MS1 and MS2 may be defined as high levels.

A time point t0 at which a mode switching request occurs may be referred to as a "mode switching time point". The mode switching time point t0 may be a time point at which a first mode is switched to a second mode or a time point at which a second mode is switched to a first mode.

As an example of the present disclosure, a period for operating in the first mode (or a period associated with the first mode) may be referred to as a "first mode period MP1". A period for operating in the second mode (or a period associated with the second mode) may be referred to as a "second mode period MP2". A mode switching period MTP, which is set based on the mode switching time point t0, may be located between the first mode period MP1 and the second mode period MP2, and may be a period for operating in either the first mode or the second mode.

Frames located in the first mode period MP1 may be referred to as "first mode frames f1 and f2". Frames located in the second mode period MP2 may be referred to as "second mode frames f4 and f5". In an example in which the display panel DP operates at the same driving frequency in the first mode and the second mode, the duration of each of the first mode frames f1 and f2 may be the same as the duration of each of the second mode frames f4 and f5. In an example in which a driving frequency (or a normal frequency) of the display panel DP in the first mode and the second mode is 60 Hz, the duration of each of the first and second mode frames f1, f2, f4, and f5 may be approximately 16.7 ms.

As an example of the present disclosure, the mode switching period MTP may have duration the same as the duration of each of the first and second mode frames f1, f2, f4, and f5. However, embodiments of the present disclosure are not limited thereto, and the mode switching period MTP may have duration, which is 'p' times the duration of each of the first and second mode frames f1, f2, f4, and f5 (where 'p' is an integer greater than 1). For example, the mode switching period MTP may have duration that is 2 or 3 times the duration of each of the first and second mode frames f1, f2, f4, and f5.

The mode switching period of MTP may include a plurality of intermediate frames. During the mode switching period MTP, the display panel DP may operate at a higher frequency (hereinafter referred to as a "compensation frequency") than the driving frequency. For example, during the mode switching period MTP, the display panel DP may operate at 240 Hz. In this case, as illustrated in FIGS. 12A and 12B, the mode switching period MTP may include four intermediate frames f3_1, f3_2, f3_3, and f3_4. The duration of each of the intermediate frames f3_1, f3_2, f3_3, and f3_4 may be the same as each other.

In the meantime, the number of intermediate frames included during the mode switching period MTP may vary based on the compensation frequency of the display panel DP. In an example in which the display panel DP operates at 120 Hz during the mode switching period MTP, the mode switching period MTP may include two intermediate frames. In an example in which the display panel DP operates at 480 Hz during the mode switching period MTP, the mode switching period MTP may include 8 intermediate frames.

During the mode switching period MTP, the compensation frequency of the display panel DP may be determined based on the luminance (or average luminance) of an image to be displayed on the display panel DP. Hereinafter, a process of determining the compensation frequency will be described with reference to FIG. 11A.

Referring to FIG. 11A, the driving controller T_con may include a luminance calculation unit 110, a frequency determination unit 120, and a control signal generation unit 130.

The luminance calculation unit 110 may calculate the average luminance based on the input image signal RGB. Information B_ave about the generated average luminance may be provided to the frequency determination unit 120. The frequency determination unit 120 may receive a mode signal MDS. In an example in which the state of the mode signal MDS is switched, the frequency determination unit 120 may be activated. For example, the frequency determination unit 120 may activate based on a first state of the mode signal MDS and deactivate based on a second state of the mode signal MDS different form the first state.

The activated frequency determination unit 120 may determine a compensation frequency of the display panel DP based on the average luminance. Information CFI about the compensation frequency may be provided to the control signal generation unit 130. The control signal generation unit 130 may generate driving control signals ECS and SCS for controlling the display panel DP and a driving circuit (e.g., the emission driving circuit EDC and/or the scan driving circuit SDC) to operate at a compensation frequency. The driving control signal may include a first control signal ECS provided to the emission driving circuit EDC and/or a second control signal SCS provided to the scan driving circuit SDC. Accordingly, during the mode switching period MTP, the emission driving circuit EDC and/or the scan driving circuit SDC may operate at the compensation frequency.

Referring to FIGS. 11A and 12B, when the emission driving circuit EDC operates at the compensation frequency during the mode switching period MTP, the emission driving circuit EDC may output the emission control signal EMj at the compensation frequency. In other words, the emission control signal EMj may be output at the driving frequency during the first mode period and the second mode period, but may be output at a compensation frequency higher than the driving frequency during the mode switching period MTP.

In the meantime, not only the emission driving circuit EDC but also the scan driving circuit SDC may operate at the compensation frequency during the mode switching period MTP. In particular, the scan driving circuit SDC may output the black scan signal SBj at the compensation frequency, and may output the remaining scan signals (e.g., the write scan signal SWj (see FIG. 7) or the compensation scan signal SCj (see FIG. 7)) at the driving frequency.

Because the write scan signal SWj is maintained at the driving frequency during the mode switching period MTP, the driver chips DIC1 to DIC4 may output data signals in one intermediate frame (e.g., the first intermediate frame f3_1) and may hold data signals without outputting them in the remaining intermediate frames (e.g., the second to fourth intermediate frames f3_2 to f3_4).

Returning to FIG. 11A, the driving controller T_con may further include a mode signal generation unit 140. The mode signal generation unit 140 may receive information about the driving speed of a means of transportation (e.g., the vehicle AM (see FIG. 1)) equipped with the display panel DP, may compare the current driving speed of the means of transportation with a predetermined reference speed, and may determine the state of the mode signal MDS based on the comparison result. In an example in which the current driving speed of the vehicle AM is greater than the reference speed, the mode signal MDS may have a second state. In an example in which the current driving speed is less than or equal to the reference speed, the mode signal MDS may have a first state. As an example of the present disclosure, the reference speed may be 5 km/h, but is not limited thereto. The reference speed may vary based on the type of transportation or a user's settings.

When the state of the mode signal MDS is switched from the first state to the second state, the operating mode of the electronic device DD (see FIG. 1) is switched from the first mode to the second mode. Moreover, when the state of the mode signal MDS is switched from the second state to the first state, the operating mode of the electronic device DD (see FIG. 2B) is switched from the second mode to the first mode. That is, a time point at which the state of the mode signal MDS is switched is the mode switching time point t0 as illustrated in FIG. 12A. The frequency determination unit 120 receives the mode signal MDS from the mode signal generation unit 140. In an example in which the state of the mode signal MDS is switched, the frequency determination unit 120 may be activated. In an example in which the state of the mode signal MDS is maintained as the previous state without being changed, the frequency determination unit 120 may not be activated.

As illustrated in FIG. 11B, the mode signal generation unit 140 (see FIG. 11A) may be omitted in a driving controller T_con_a. In this case, the state of a mode signal MDSa may not be generated based on the driving speed of the means of transportation, but may be changed by the user's manipulation (or settings). The frequency determination unit 120 may receive the mode signal MDSa. In an example in which the state of the mode signal MDSa is switched, the frequency determination unit 120 may be activated.

Figure 13:
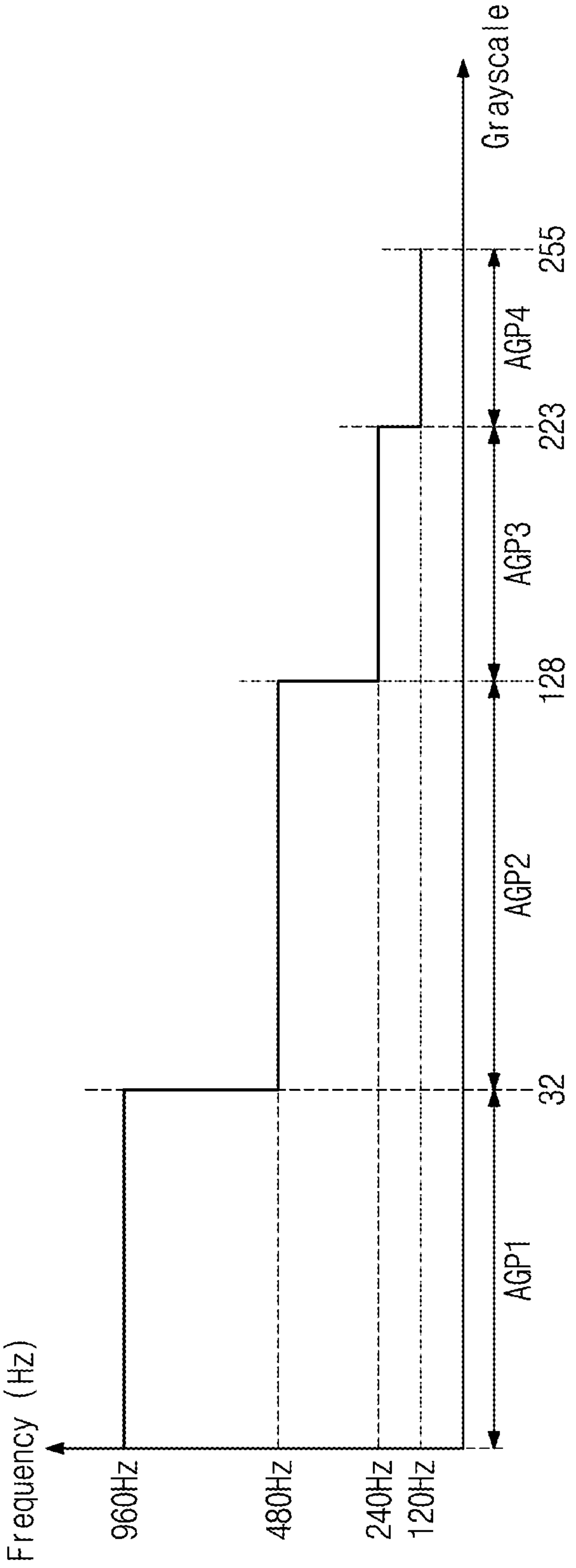
FIG. 13 is a diagram illustrating a frequency for each average luminance period, according to an embodiment of the present disclosure.

FIG. 13 is a diagram illustrating a compensation frequency for each average luminance period, according to an embodiment of the present disclosure.

Referring to FIGS. 11A and 13, the frequency determination unit 120 may set a compensation frequency based on comparing the average luminance of the input image signal RGB (as included in the information B_ave) with at least one predetermined reference luminance. As an example of the present disclosure, when the average luminance is greater than or equal to the reference luminance in the case where the reference luminance is set for the frequency determination unit 120, the frequency determination unit 120 may not compensate for the driving frequency. However, when the average luminance is smaller than the reference luminance, the frequency determination unit 120 may compensate for the driving frequency such that the driving frequency becomes a compensation frequency higher than the driving frequency.

FIG. 13 illustrates that four pieces of reference luminance (hereinafter, referred to as "first to fourth pieces of reference luminance") are set for the frequency determination unit 120, but embodiments of the present disclosure are not limited thereto. For example, two or three pieces of reference luminance may be set for the frequency determination unit 120. As an example of the present disclosure, the first reference luminance may have a grayscale of 32, the second reference luminance may have a grayscale of 128, the third reference luminance may have a grayscale of 223, and the fourth reference luminance may have a grayscale of 255. The grayscale values of first to fourth pieces of reference luminance may not be limited thereto and may be set in various ways.

When the average luminance is smaller than the first reference luminance (i.e., the average luminance belongs to a first reference range AGP1), the frequency determination unit 120 may compensate for the driving frequency such that the driving frequency becomes the first compensation frequency. In this case, during the mode switching period MTP, each of the emission control signal EMj (see FIG. 12B) and the black scan signal SBj (see FIG. 12B) may have the first compensation frequency. As an example of the present disclosure, the first compensation frequency may be 4k or 3k times the driving frequency. Here, 'k' may have a value greater than or equal to 1. Descriptions herein of a signal having a particular frequency (e.g., driving frequency, compensation frequency) may refer to rate at which the signal oscillates or varies over time. For example, a signal described as having a particular frequency may refer to the signal being generated or provided by a circuit according to the particular frequency, such that the signal oscillates or varies over time according to the particular frequency.

In an example in which the average luminance is greater than or equal to the first reference luminance and is smaller than the second reference luminance (i.e., the average luminance belongs to a second reference range AGP2), the frequency determination unit 120 may compensate for the driving frequency such that the driving frequency becomes the second compensation frequency. In this case, during the mode switching period MTP, each of the emission control signal EMj and the black scan signal SBj may have the second compensation frequency. As an example of the present disclosure, the second compensation frequency may be 2k times the driving frequency. In an example in which the average luminance is greater than or equal to the second reference luminance and is smaller than the third reference luminance (i.e., the average luminance belongs to a third reference range AGP3), the frequency determination unit 120 may compensate for the driving frequency such that the driving frequency becomes the third compensation frequency. In this case, during the mode switching period MTP, each of the emission control signal EMj and the black scan signal SBj may have the third compensation frequency. As an example of the present disclosure, the third compensation frequency may be k or 1.5k times the driving frequency. In an example in which the average luminance is greater than or equal to the third reference luminance and is smaller than or equal to the fourth reference luminance (i.e., the average luminance belongs to a fourth reference range AGP4), the frequency determination unit 120 may not compensate for the driving frequency. In this case, during the mode switching period MTP, each of the emission control signal EMj and the black scan signal SBj may have the driving frequency.

The first compensation frequency may be higher than the second compensation frequency, and the second compensation frequency may be higher than the third compensation frequency. The third compensation frequency may be higher than or equal to the driving frequency. In FIG. 13, the first compensation frequency may be 960 Hz; the second compensation frequency may be 480 Hz; the third compensation frequency may be 240 Hz; and the driving frequency may be 120 Hz.

Although FIG. 13 illustrates that 'k' is 2, embodiments of the present disclosure are not limited thereto, and 'k' may be changed to 1 or 1.5. In an example in which 'k' is 1, the first compensation frequency may be 480 Hz, the second compensation frequency may be 240 Hz, the third compensation frequency may be 180 Hz, and the driving frequency may be 120 Hz.

A flicker that appears during mode switching may vary in presence or intensity based on the luminance of an image displayed on the electronic device DD. In other words, a flicker is less noticeable in a high-grayscale image, while a flicker is more noticeable in a low-grayscale image. Because flicker presence or intensity varies based on a grayscale, the frequency determination unit 120 may set the level of the compensation frequency differently based on the average luminance. Accordingly, while the flicker phenomenon is effectively improved, the problem of unnecessary or undesired increase in power consumption due to frequency compensation may be mitigated or prevented.

Figure 14:
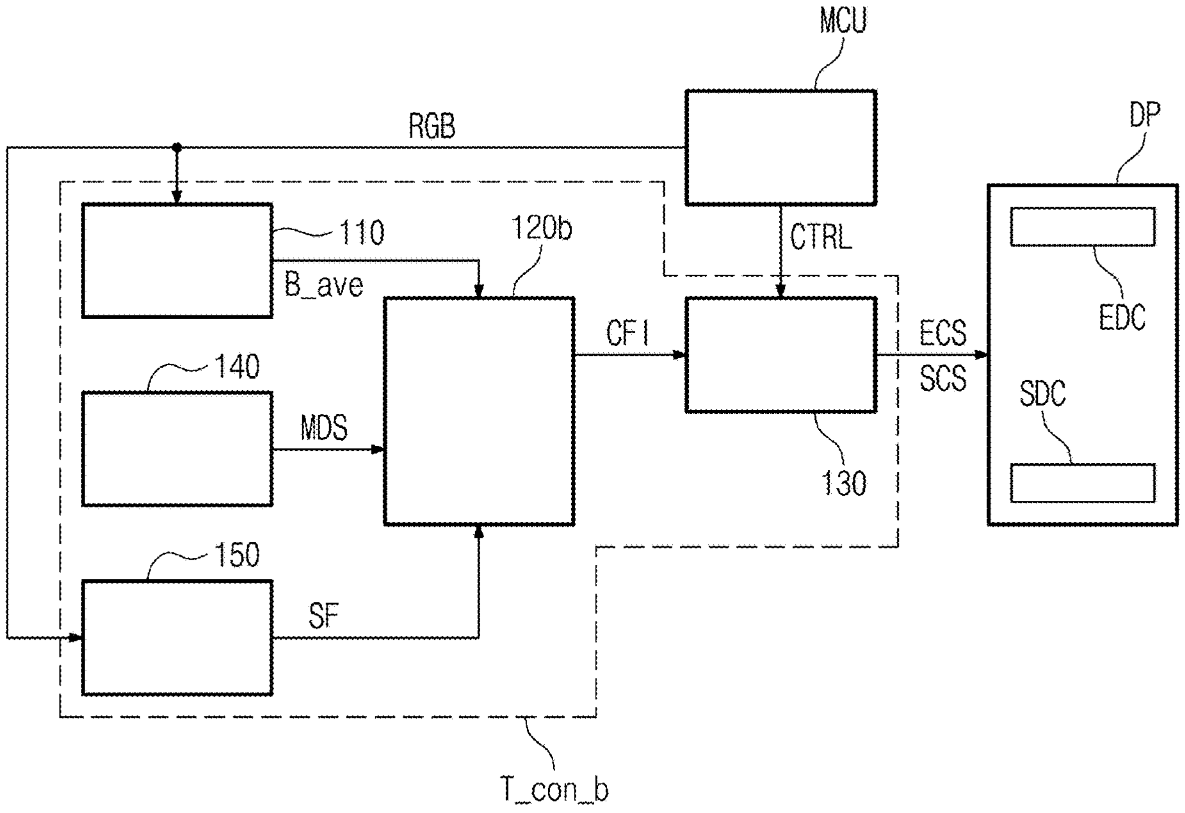
FIG. 14 is a block diagram of a driving controller according to an embodiment of the present disclosure.

FIG. 14 is a block diagram of a driving controller according to an embodiment of the present disclosure. Components, which are equal to the components illustrated in FIG. 11A, from among components illustrated in FIG. 14 are marked by the same reference signs, and thus, additional descriptions will be omitted.

Referring to FIGS. 13 and 14, a driving controller T_con_b may further include a spatial frequency calculation unit 150. The spatial frequency calculation unit 150 may calculate a spatial frequency based on the input image signal RGB. The spatial frequency calculation unit 150 may calculate the spatial frequency for the input image signal RGB through a Fourier transform algorithm, and the value of the calculated spatial frequency may vary based on the complexity of the input image signal. In other words, as the spatial frequency increases, the level of complexity of the input image signal may increase. As the spatial frequency decreases, the level of complexity of the image signal may decrease. At a mode switching time point, the presence or intensity of flicker is low when the level of complexity is high, and the presence or intensity of the flicker is high when the level of complexity is low.

A frequency determination unit 120*b* may further receive information SF about a spatial frequency from the spatial frequency calculation unit 150 together with the information B_ave about average luminance from the luminance calculation unit 110. In the case where the frequency determination unit 120*b* is activated when the state of the mode signal MDS is switched, the frequency determination unit 120*b* may determine the compensation frequency in consideration of both the average luminance and the spatial frequency. The frequency determination unit 120*b* may determine the compensation frequency by comparing the spatial frequency with a predetermined reference spatial frequency.

In an example in which the spatial frequency is greater than the reference spatial frequency even though the average luminance is within the first reference range, the frequency determination unit 120*b* may compensate for the driving frequency such that the driving frequency becomes a second compensation frequency lower than the first compensation frequency. Furthermore, when the average luminance is within the first reference range and the spatial frequency is less than or equal to the reference spatial frequency, the frequency determination unit 120*b* may compensate for the driving frequency such that the driving frequency becomes the first compensation frequency.

As such, compared to the case where only average luminance is considered, power consumption may be reduced by reflecting the level of image complexity in the determination of compensation frequency by using the spatial frequency.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described herein, in a display panel operating in a first mode or a second mode, the flicker phenomenon during mode switching may be prevented or reduced by compensating for the frequency of a driving signal applied to the display panel during a mode switching period set based on a mode switching time point from the first mode to the second mode.

In particular, while the flicker phenomenon is effectively improved by setting the compensation frequency differently based on the average luminance of an image, the problem of unnecessary or undesired increase in power consumption due to frequency compensation may be mitigated or prevented.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising:

a display panel comprising a pixel; and a driving circuit which applies a driving signal to the display panel, wherein:

the pixel comprises:

a first light emitting element;

a second light emitting element; and a pixel circuit unit which drives the first light emitting element and the second light emitting element, the pixel circuit unit comprises:

a first switching circuit which is electrically connected between a common node and the first light emitting element and applies a driving current to the first light emitting element in response to a first switching signal activated in a first mode; and a second switching circuit which is electrically connected between the common node and the second light emitting element and applies the driving current to the second light emitting element in response to a second switching signal activated in a second mode, the driving signal comprises an emission control signal and has a compensation frequency during a mode switching period set based on a mode switching time point, and the compensation frequency is higher than a driving frequency of the driving signal during a first mode period associated with the first mode or a second mode period associated with the second mode, wherein the first mode period and the second mode period are different from the mode switching period, the pixel circuit unit further comprises:

a first transistor connected between a first driving voltage line and the common node, wherein the first transistor is controlled based on a potential of a first node;

a second transistor connected between a data line and the first node; and an emission control transistor which is connected between the common node and the first transistor and operates in response to the emission control signal.

2. The electronic device of claim 1, wherein the electronic device sets the compensation frequency of the driving signal based on luminance of an input image signal during the mode switching period.

3. The electronic device of claim 1, wherein:

the driving circuit comprises:

an emission driving circuit which generates the emission control signal; and a scan driving circuit which generates a scan signal, and the emission control signal has the compensation frequency during the mode switching period.

4. The electronic device of claim 3, wherein:

the first switching circuit comprises a first mode switching transistor which is connected between the common node and an anode of the first light emitting element and receives the first switching signal, and the second switching circuit comprises a second mode switching transistor which is connected between the common node and an anode of the second light emitting element and receives the second switching signal.

5. The electronic device of claim 4, wherein the pixel circuit unit further comprises:

a first initialization transistor which is connected between the anode of the first light emitting element and an initialization voltage line and operates in response to a black scan signal among the scan signal; and a second initialization transistor which is connected between the anode of the second light emitting element and the initialization voltage line and operates in response to the black scan signal, wherein the black scan signal has the compensation frequency during the mode switching period.

6. The electronic device of claim 1, further comprising:

a driving controller which receives an input image signal and controls driving of the driving circuit, wherein the driving controller comprises:

a luminance calculation unit which calculates average luminance based on the input image signal;

a frequency determination unit which determines the compensation frequency of the driving signal based on the average luminance; and a control signal generation unit which generates a driving control signal and provides the driving control signal to the driving circuit such that the driving circuit operates at the determined compensation frequency.

7. The electronic device of claim 6, wherein:

the frequency determination unit receives a mode signal, and the frequency determination unit activates when a state of the mode signal is switched.

8. The electronic device of claim 7, wherein the driving controller further comprises:

a mode signal generation unit which:

receives information about a driving speed of a means of transportation on which the display panel is mounted;

compares the driving speed with a predetermined reference speed; and determines the state of the mode signal based on a result of the comparison.

9. The electronic device of claim 1, further comprising:

a driving controller which receives an input image signal and controls driving of the driving circuit, wherein the driving controller comprises:

a luminance calculation unit which calculates average luminance based on the input image signal;

a spatial frequency calculation unit which calculates a spatial frequency based on the input image signal;

a frequency determination unit which determines the compensation frequency of the driving signal based on the average luminance and the spatial frequency; and a control signal generation unit which generates a driving control signal and provides the driving control signal to the driving circuit such that the driving circuit operates at the determined compensation frequency.

10. The electronic device of claim 9, wherein the spatial frequency calculation unit generates the spatial frequency by applying a Fourier transform algorithm to the input image signal, wherein a value of the spatial frequency varies based on complexity of the input image signal.

11. An electronic device comprising:

a display panel comprising a pixel; and a driving circuit which applies a driving signal to the display panel, wherein:

the pixel comprises:

a first light emitting element;

a second light emitting element; and a pixel circuit unit which drives the first light emitting element and the second light emitting element, the pixel circuit unit comprises:

a first switching circuit which is electrically connected to the first light emitting element and applies a driving current to the first light emitting element in response to a first switching signal activated in a first mode; and a second switching circuit which is electrically connected to the second light emitting element and applies the driving current to the second light emitting element in response to a second switching signal activated in a second mode, the driving signal has a compensation frequency during a mode switching period set based on a mode switching time point, and the compensation frequency is higher than a driving frequency of the driving signal during a first mode period associated with the first mode or a second mode period associated with the second mode, wherein the first mode period and the second mode period are different from the mode switching period, wherein during the mode switching period, the compensation frequency of the driving signal is set based on comparing an average luminance of the input image signal with at least one reference luminance.

12. The electronic device of claim 11, wherein the electronic device:

outputs the driving signal having a first compensation frequency based on determining, from a result of the comparing, that the average luminance is smaller than a first reference luminance;

outputs the driving signal having a second compensation frequency based on determining, from the result of the comparing, that the average luminance is greater than or equal to the first reference luminance and is smaller than a second reference luminance; and outputs the driving signal having a third compensation frequency based on determining, from the result of the comparing, that the average luminance is greater than or equal to the second reference luminance and is smaller than a third reference luminance, wherein:

the first compensation frequency is higher than the second compensation frequency, and the second compensation frequency is higher than the third compensation frequency.

13. The electronic device of claim 12, wherein the third compensation frequency is higher than or equal to the driving frequency of the driving signal during the first mode period or the second mode period which are different from the mode switching period.

14. The electronic device of claim 13, wherein:

the mode switching period has duration equal to 'p' times a duration of one mode frame defined by the driving frequency, and 'p' is an integer greater than 1.

15. An electronic device comprising:
a display panel comprising a pixel;
a driving circuit which applies a driving signal to the display panel; and
a driving controller which receives an input image signal and controls driving of the driving circuit, wherein:
the driving controller comprises:
a luminance calculation unit which calculates average luminance based on the input image signal;
a frequency determination unit which:
receives a mode signal,
activates when a state of the mode signal is switched, and
determines a compensation frequency of the driving signal based on the average luminance; and
a control signal generation unit which generates a driving control signal and provides the driving control signal to the driving circuit such that the driving circuit operates at the determined compensation frequency,
the driving signal has the compensation frequency during a mode switching period set based on a time point at which the state of the mode signal is switched, and
the compensation frequency is higher than a driving frequency of the driving signal during a first mode period or a second mode period, wherein the first mode period and the second mode period are different from the mode switching period.

16. The electronic device of claim 15, wherein:
the driving controller further comprises a spatial frequency calculation unit which calculates a spatial frequency based on the input image signal, and
the frequency determination unit determines the compensation frequency of the driving signal based on the average luminance and the spatial frequency.

17. The electronic device of claim 16, wherein the spatial frequency calculation unit generates the spatial frequency by applying a Fourier transform algorithm to the input image signal, wherein a value of the spatial frequency varies based on complexity of the input image signal.

18. The electronic device of claim 15, wherein the driving controller further comprises:
a mode signal generation unit which:
receives information about a driving speed of a means of transportation on which the display panel is mounted;
compares the driving speed with a predetermined reference speed; and
determines the state of the mode signal based on a result of the comparison.

19. The electronic device of claim 15, wherein the electronic device:
outputs the driving signal having a first compensation frequency based on determining that the average luminance is smaller than a first reference luminance,
outputs the driving signal having a second compensation frequency based on determining that the average luminance is greater than or equal to the first reference luminance and is smaller than a second reference luminance,
outputs the driving signal having a third compensation frequency based on determining that the average luminance is greater than or equal to the second reference luminance and is smaller than a third reference luminance,
wherein:
the first compensation frequency is higher than the second compensation frequency, and
the second compensation frequency is higher than the third compensation frequency,
wherein the third compensation frequency is higher than or equal to the driving frequency of the driving signal during the first mode period or the second mode period.

* * * * *